US012802061B2

(12) United States Patent
Hertzog et al.

(10) Patent No.: US 12,802,061 B2
(45) Date of Patent: *Nov. 17, 2026

(54) METHODS FOR EXCHANGING AND EVALUATING VIRTUAL CURRENCY

(71) Applicants: Bprotocol Foundation, Zug (CH); Localcoin Ltd., Tel-Aviv (IL)

(72) Inventors: Eyal Hertzog, Ramat-HaSharon (IL); Guy Ben Artzi, Rishpon (IL); Galia Benartzi, Tel-Aviv (IL); Yehuda Levi, Oporto (PT)

(73) Assignees: Bprotocol Foundation, Zug (CH); Localcoin Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/549,021

(22) Filed: Feb. 25, 2026

(65) Prior Publication Data

US 2026/0187626 A1 Jul. 2, 2026

Related U.S. Application Data

(63) Continuation of application No. 18/779,119, filed on Jul. 22, 2024, now Pat. No. 12,579,540, which is a (Continued)

(51) Int. Cl.

*G06Q 20/38* (2012.01)
*G06F 21/64* (2013.01)

(Continued)

(52) U.S. Cl.

CPC ........... *G06Q 20/381* (2013.01); *G06F 21/64* (2013.01); *G06Q 20/065* (2013.01); *G06Q 20/10* (2013.01);

(Continued)

(58) Field of Classification Search

CPC .. G06Q 20/065; G06Q 20/0658; G06Q 20/10; G06Q 20/3678; G06Q 20/381;

(Continued)

(56) References Cited

U.S. PATENT DOCUMENTS 9,818,092 B2 11/2017 Pennanen
10,565,645 B1 2/2020 Kurani (Continued)

FOREIGN PATENT DOCUMENTS

CN 101356776 1/2009
CN 102160069 8/2011

(Continued)

OTHER PUBLICATIONS

Advisory Action Official Action Dated Dec. 1, 2021 from US Patent and Trademark Office Re. U.S. Appl. No. 16/476,312. (4 pages).

(Continued)

*Primary Examiner* — Wodajo Getachew

(57) ABSTRACT

Method, system, and computer program product for executing cryptocurrency transactions. A request to execute a transaction related to a first cryptocurrency token is received by a secure ledger network. The secure ledger network executes a smart contract validated thereby and determining at least one rule for performing the transaction. Execution of the transaction comprising determining a price of the first cryptocurrency token and/or an amount of at least one of the first cryptocurrency token and another cryptocurrency token obtained in exchange of one another, based on a group of parameters comprising: a total amount (Tt) of the first cryptocurrency token in circulation, a total reserve (Tr) of the other cryptocurrency token in a reserve, and a reserve ratio constant (Rr) predefined as a ratio between the total (Continued)

reserve and a token market cap. A secure ledger maintained by the secure ledger network is updated about completion of the transaction.

21 Claims, 14 Drawing Sheets

Related U.S. Application Data continuation of application No. 18/105,944, filed on Feb. 6, 2023, now Pat. No. 12,045,807, which is a continuation of application No. 16/476,312, filed as application No. PCT/IL2018/050023 on Jan. 8, 2018, now Pat. No. 11,574,291.

(60) Provisional application No. 62/443,722, filed on Jan. 8, 2017.

(51) Int. Cl.

| | |
|---|---|
| ***G06Q 20/06*** | (2012.01) |
| ***G06Q 20/10*** | (2012.01) |
| ***G06Q 20/36*** | (2012.01) |
| ***H04L 9/00*** | (2022.01) |
| ***H04L 9/32*** | (2006.01) |

(52) U.S. Cl.
CPC ....... *G06Q 20/3678* (2013.01); *G06Q 20/389* (2013.01); *H04L 9/3239* (2013.01); *H04L 9/50* (2022.05); *G06Q 20/0658* (2013.01); *G06Q 2220/00* (2013.01); *H04L 2209/56* (2013.01)

(58) Field of Classification Search
CPC .. G06Q 20/389; G06Q 2220/00; G06F 21/64; H04L 9/50; H04L 9/3239; H04L 2209/56
USPC ............................................................ 705/75
See application file for complete search history.

(56) References Cited

U.S. PATENT DOCUMENTS

| | | | | |
|---|---|---|---|---|
| 11,107,049 | B2 | 8/2021 | Hertzog et al. | |
| 2003/0028458 | A1 | 2/2003 | Gaillard | |
| 2008/0015974 | A1 | 1/2008 | Balabon | |
| 2013/0031025 | A1 | 1/2013 | Gibbs | |
| 2015/0170112 | A1 | 6/2015 | DeCastro | |
| 2015/0262168 | A1* | 9/2015 | Armstrong | G06Q 20/065 705/39 |
| 2015/0332256 | A1 | 11/2015 | Minor | |
| 2015/0363876 | A1 | 12/2015 | Ronca et al. | |
| 2015/0371224 | A1 | 12/2015 | Lingappa | |
| 2015/0379510 | A1 | 12/2015 | Smith et al. | |
| 2016/0012424 | A1 | 1/2016 | Simon et al. | |
| 2016/0092988 | A1 | 3/2016 | Letourneau | |
| 2016/0261690 | A1 | 9/2016 | Ford | |
| 2016/0358161 | A1* | 12/2016 | Cobban | G06Q 20/0655 |
| 2017/0005804 | A1 | 1/2017 | Zinder | |
| 2017/0046689 | A1 | 2/2017 | Lohe et al. | |
| 2017/0048235 | A1 | 2/2017 | Lohe et al. | |
| 2017/0083907 | A1 | 3/2017 | McDonough et al. | |
| 2017/0155515 | A1* | 6/2017 | Androulaki | H04L 9/006 |
| 2017/0221052 | A1 | 8/2017 | Sheng et al. | |
| 2017/0372300 | A1* | 12/2017 | Dunlevy | G06Q 20/363 |
| 2018/0019873 | A1* | 1/2018 | Kraemer | H04L 9/3218 |
| 2018/0096360 | A1* | 4/2018 | Christidis | G06Q 20/02 |
| 2018/0191714 | A1 | 7/2018 | Jentzsch et al. | |
| 2018/0343114 | A1 | 11/2018 | Ben-Ari | |
| 2019/0034888 | A1 | 1/2019 | Grassadonia et al. | |
| 2019/0385156 | A1 | 12/2019 | Liu | |
| 2020/0027067 | A1 | 1/2020 | Hertzog et al. | |
| 2020/0051043 | A1 | 2/2020 | Wilson et al. | |
| 2020/0143496 | A1* | 5/2020 | Saito | G06Q 50/18 |
| 2020/0175506 | A1 | 6/2020 | Snow | |
| 2020/0193418 | A1 | 6/2020 | Augustine et al. | |
| 2021/0073755 | A1 | 3/2021 | Hertzog et al. | |
| 2023/0186255 | A1 | 6/2023 | Hertzog et al. | |
| 2024/0378595 | A1 | 11/2024 | Hertzog et al. | |

FOREIGN PATENT DOCUMENTS

| | | |
|---|---|---|
| KR | 10-2015-0107971 | 9/2015 |
| KR | 10-1591244 | 2/2016 |
| KR | 10-2016-0095720 | 8/2016 |
| WO | WO 2017/004527 | 1/2017 |
| WO | WO 2018/127923 | 7/2018 |

OTHER PUBLICATIONS

Decision on Rejection Dated Jul. 14, 2023 From the State Intellectual Property Office of the People's Republic of China Re. Application No. 201880013201.1. (4 pages).
Final Official Action Dated Sep. 17, 2021 from the US Patent and Trademark Office Re. U.S. Appl. No. 16/476,312. (19 pages).
Grounds of Reason of Rejection Dated May 19, 2022 From the Korean Intellectual Property Office Re. Application No. 2019-7023331 and its Translation into English. (12 Pages).
International Preliminary Report on Patentability Dated Jul. 18, 2019 From the International Bureau of WIPO Re. Application No. PCT/IL2018/050023. (8 Pages).
International Search Report and the Written Opinion Dated Apr. 19, 2018 From the International Searching Authority Re. Application No. PCT/IL2018/050023. (8 Pages).
Interview Summary Dated Jun. 1, 2021 From the US Patent and Trademark Office Re. U.S. Appl. No. 16/952,122. (2 Pages).
Notice of Allowance dated Nov. 10, 2022 from the US Patent and Trademark Office Re. U.S. Appl. No. 16/476,312. (5 pages).
Notice of Allowance Dated Jul. 21, 2021 together with Interview Summary from the US Patent and Trademark Office Re. U.S. Appl. No. 16/952,122. (13 pages).
Notice of Allowance Dated Mar. 22, 2024 together with Interview Summary from the US Patent and Trademark Office Re. U.S. Appl. No. 18/105,944. (22 pages).
Notice of Allowance Dated Nov. 25, 2025 together with Interview Summary Dated Oct. 23, 2025 from the US Patent and Trademark Office Re. U.S. Appl. No. 18/779,119. (22 pages).
Notice of Allowance together with Interview Summary Dated Oct. 12, 2022 From the US Patent and Trademark Office Re. U.S. Appl. No. 16/476,312. (18 Pages).
Notice of Reason(s) for Rejection Dated Feb. 8, 2022 From the Japan Patent Office Re. Application No. 2019-557713 and Its Translation Into English. (12 Pages).
Notice of Reason(s) for Rejection Dated Sep. 13, 2022 From the Japan Patent Office Re. Application No. 2019-557713 and Its Translation Into English. (10 Pages).
Notification of Office Action and Search Report Dated Nov. 7, 2022 From the State Intellectual Property Office of the People's Republic of China Re. Application No. 201880013201.1. (6 Pages).
Notification of Office Action Dated Mar. 23, 2023 From the State Intellectual Property Office of the People's Republic of China Re. Application No. 201880013201.1 (3 pages).
Official Action Dated Jun. 10, 2022 from US Patent and Trademark Office Re. U.S. Appl. No. 16/476,312. (9 pages).
Official Action Dated Apr. 13, 2021 from the US Patent and Trademark Office Re. U.S. Appl. No. 16/476,312. (10 pages).
Official Action Dated Apr. 23, 2021 from the US Patent and Trademark Office Re. U.S. Appl. No. 16/952,122. (12 pages).
Restriction Official Action Dated Jul. 11, 2025 From the US Patent and Trademark Office Re. U.S. Appl. No. 18/779,119. (6 Pages).
Restriction Official Action Dated Jan. 29, 2021 From the US Patent and Trademark Office Re. U.S. Appl. No. 16/952,122. (6 Pages).
Translation Dated Aug. 2, 2023 of Decision on Rejection Dated Jul. 14, 2023 From the State Intellectual Property Office of the People's Republic of China Re. Application No. 201880013201.1. (3 pages).

(56) References Cited

OTHER PUBLICATIONS

Translation Dated Nov. 16, 2022 of Notification of Office Action Dated Nov. 7, 2022 From the State Intellectual Property Office of the People's Republic of China Re. Application No. 201880013201.1 (2 pages).
Translation Dated Mar. 31, 2023 of Notification of Office Action Dated Mar. 23, 2023 From the State Intellectual Property Office of the People's Republic of China Re. Application No. 201880013201.1 (3 pages).
Bitcoin "Alt Chains and Atomic Transfers", Bitcoin Forum, 18P, May 2, 2013, retrieved from Internet Feb. 22, 2022.
Dong He et al. "Virtual Currencies and Beyond: Initial Considerations"; IMF Staff Discussion Note, pp. 1-42, Jan. 2016.
Swartz "Tokens, Ledgers, and Rails: the Communication of Money", University of Southern California ProQuest Dissertations Publishing, 2015. 10799786, pp. 15,74, 176, Aug. 2015.

* cited by examiner

1100

1400

METHODS FOR EXCHANGING AND EVALUATING VIRTUAL CURRENCY

RELATED APPLICATIONS

This application is a continuation of U.S. patent application Ser. No. 18/779,119, filed on Jul. 22, 2024, which is a continuation of U.S. patent application Ser. No. 18/105,944, filed Feb. 6, 2023, now U.S. Pat. No. 12,045,807, which is a continuation of U.S. patent application Ser. No. 16/476,312 filed on Jul. 8, 2019, now U.S. Pat. No. 11,574,291, which is a National Phase of PCT Patent Application No. PCT/IL2018/050023 having International Filing Date of Jan. 8, 2018, which claims the benefit of priority under 35 USC § 119(e) of U.S. Provisional Patent Application No. 62/443,722 filed on Jan. 8, 2017. The contents of the above applications are all incorporated by reference as if fully set forth herein in their entirety.

FIELD OF THE INVENTION

The present invention relates generally to the field of virtual currency. More specifically the present invention relates to the field of exchange and evaluation of virtual currency.

BACKGROUND OF THE INVENTION

The appearance of virtual currencies such as Bitcoin introduces some new possibilities for trade and business. Bitcoin is one example of a decentralized virtual cryptocurrency that is independent of any central bank. Unlike traditional currency Bitcoin is not minted 'by fiat', but rather mined by an interconnected network of computers.

The process of mining involves running a certain algorithm by the network members on a set of recorded transactions. Once a network member successfully calculates a certain computation involving the hash of a set (or 'block') of transactions, this set is recorded in a 'blockchain' which is a series of such sets, and which serves as a public ledger containing the entire transaction history of the currency.

The Bitcoin blockchain is limited to sets of simple information and scripts such as transaction details, and conditioning a transaction on a minimum number of signatories. It was therefore argued that for a virtual currency to truly revolutionize trade it must also provide built-in means for facilitating complex contracts and deals with the currency.

Project Ethereum was proposed and launched shortly thereafter. Ethereum builds upon Bitcoin. Not only does it allow decentralized data storage in its blockchain, Ethereum also allows storing program code on its blockchain and running it concurrently by any number of network members. By predicating release of funds upon verifiable occurrences, Ethereum enables smart contract functionality.

Basically, a network member uploads a computer program written in one of several permitted languages to the blockchain. The member may then condition the release of an amount of ETH (the currency underlying Ethereum) upon reaching the end of this program. Various network members thereafter run the program concurrently and reach a consensus on the resulted output.

The scripting languages in Ethereum are Turing complete as they can implement any logic rules and initiate any calculations available.

This feature allows any member to issue and trade with a custom virtual currency upon the Ethereum network. For the sake of clarity, a custom virtual currency issued and based upon another virtual currency is referred to as a Token. A Token may have various uses. While a certain Token will represent money, another Token will represent club member points or frequent flyer points. Tokens may be traded for ETH or for any other commodities and Tokens via the Ethereum network.

Before Ethereum, a person was required to launch a new blockchain utilizing custom user clients and mining algorithm, in order to issue a custom decentralized virtual currency. The emergence of the Ethereum network allows easy issuance of Tokens with minimal setup.

It should be mentioned that after Ethereum, several other virtual currency networks implementing smart contracts were established. Prominent examples include Lisk and RootStock.

With the recent ability to issue a variety of Tokens using virtual currency networks, shortcomings regarding the ability to determine the value of such Tokens were identified.

Traditionally, value of a currency is determined by the price of a transaction between willing parties. That is how FOREX exchange rates are calculated. Each currency is listed with its exchange rate to another currency. While listing and managing the exchange rates of the 180 existing recognized currencies is manageable, employing this method on an unlimited variety of Token types, is not viable.

In addition, many freshly issued Token types have only a limited trading volume or none at all. It is understandable that due to the abundance of Token types, each Token will be seldom used. This will increase the difficulties entailed in evaluating an unlimited variety of Token types via a FOREX method.

In light of the above described state of the art, it is clear that there is a long-standing need for a solution that employs a different approach to resolve the issues and deficiencies in existing attempted solutions in the field.

SUMMARY OF THE INVENTION

There may be provided a secure ledger network for executing cryptocurrency transactions, the secure ledger network may include at least one hardware processor, a non-transitory machine-readable storage medium having an executable computer readable program code, the at least one hardware processor configured to execute the computer-readable program code to: receive, by the secure ledger network, a request to validate a smart contract that determines at least one rule for performing a transaction related to a first cryptocurrency token, wherein an execution of the transaction may include determining a price of the first cryptocurrency token based on a status of the first cryptocurrency token, and a status of an other cryptocurrency token; determine whether to validate the smart contract; when determining to validate the smart contract then updating a secure ledger maintained by the secure ledger network with the smart contract; receiving, by the secure ledger network, a request to execute a transaction related to the first cryptocurrency token; performing the transaction by executing, by the secure ledger network, the smart contract; and updating the secure ledger about a completion of the transaction.

The secure ledger may be a blockchain or may differ from a block chain.

Any reference to a digital signature may be regarded as a reference to a digital signature associated with an entity that requested to upload the smart contract to the secure ledger. The reception of the digital signature and the validation of the digital signature may be optional.

A validation of the smart contact (before uploading the smart contract to the secure ledger) may or may not involve determining whether to reject the upload of the smart contract. The validation may include determining that a party is willing to pay for the upload of the smart contract to the secure ledger.

There may be provided a secure ledger network may include at least one memory device; and at least one processing device operatively coupled to the at least one memory device, wherein the at least one processing device is configured to execute computer-readable program code to: determine at least one rule for performing a transaction related to a first cryptocurrency token, wherein an execution may include determining the status of the first cryptocurrency token, and a status of an other token; update a secure ledger maintained by the secure ledger network; receive a digital signature; verify the authenticity of the digital signature; execute a transaction related to the first cryptocurrency token; and update a secure ledger about a completion of the transaction.

There may be provided a computer system for executing transactions installed on a blockchain network, the computer system may include a memory device; a processing device operatively coupled to the memory device, wherein the processing device is configured to execute computer-readable program code to: validate the program code; determine at least one rule for performing a transaction related to a first cryptocurrency token, wherein an execution of the transaction may include determining the status of the first cryptocurrency token, and a status of an other token; update a secure ledger maintained by the secure ledger network; execute a transaction related to the first cryptocurrency token; and update the secure ledger about a completion of the transaction.

There may be provided a system may include a network may include a plurality of nodes, wherein each node in the plurality of nodes is configured to transact autonomously with at least two nodes in the plurality of nodes; wherein a first node of the plurality of nodes is configured to generate a smart contract, wherein a second node of the plurality of nodes is configured to execute the smart contract, wherein an execution of the smart contract may include determining the price of a first cryptocurrency token based on the status of the first cryptocurrency token stored in a secure ledger; executing a transaction based on the price of the first cryptocurrency token; and updating the secure ledger using the transaction information.

There may be provided a system for executing a transaction involving a smart contract generated cryptocurrency token, the system may include at least one hardware processor; a non-transitory machine-readable storage medium having program instructions, the at least one hardware processor configured to: receive, a request to validate a smart contract that determines at least one rule for performing a transaction related to the smart contract generated cryptocurrency token, wherein an execution of the transaction may include determining a price of the smart contract generated cryptocurrency token based on a reserve of an other cryptocurrency token; the secure ledger network may include at least one computer that may include at least one hardware processor; receive, a digital signature; verify the authenticity of the digital signature; verify the code of the smart contract; update a secure ledger maintained by the secure ledger network with the smart contract; receive, by the secure ledger network, a request to execute a transaction related to the smart contract generated cryptocurrency token; and perform the transaction by executing, by the secure ledger network, the smart contract.

There may be provided a non-transitory machine-readable medium having stored thereon machine-readable instructions executable to cause a computerized machine to perform operations may include exchanging at least one type of cryptocurrency token for an other type of cryptocurrency token; receiving, from a secure ledger, a status of the at least one type of cryptocurrency token; receiving by the non-transitory machine-readable medium, a digital signature; verifying, by the non-transitory machine-readable medium the authenticity of the digital signature; determining the value of the at least one type of cryptocurrency token in terms of the other type of cryptocurrency token; transferring the at least one type cryptocurrency token from address controlled by a user to an address controlled by an operator; transferring the other type of cryptocurrency token from the address controlled by the operator to the address controlled by the user, wherein the transfer was associated with the value of the least one type of cryptocurrency token in terms of the other type of cryptocurrency token; and publishing to a secure ledger, an updated status of the at least one type of cryptocurrency token and the other type of cryptocurrency.

There may be provided a non-transitory computer-readable medium having stored thereon computer executable code that when executed by at least one hardware processor performs: receiving a request for transaction based on request from an initiating party, wherein the request is for the transfer of an at least one type of cryptocurrency token for an other type of cryptocurrency token; receiving by the computer-readable medium, a digital signature; verifying, by the computer-readable medium the authenticity of the digital signature; determining the price of the at least one type of cryptocurrency token based on the status of the at least one cryptocurrency token and an other type of cryptocurrency; executing a transaction, wherein the at least one type of cryptocurrency is transferred from address controlled by a user to an address controlled by an operator, and the other type of cryptocurrency is transferred from the operator to the user.

There may be provided a non-transitory computer-readable medium having stored thereon computer-executable code that when executed by at least one hardware processor performs: receiving a request for transaction based on request from an initiating party, wherein the request is for the transfer of first cryptocurrency token for a smart contract generated cryptocurrency token; receiving by the computer-readable medium, a digital signature; verifying, by the computer-readable medium the authenticity of the digital signature; determining the price of smart contract generated cryptocurrency token based on a reserve of an other token; and executing a transaction, wherein the first cryptocurrency token is transferred from address controlled by a user to an address controlled by an operator, and the smart contract generated cryptocurrency token is transferred from the operator to the user.

There may be provided a method for executing a transaction using a smart contract generated cryptocurrency token by a secure ledger network, the method may include receiving, by the secure ledger network, a request to validate a smart contract that determines at least one rule for performing a transaction related to the smart contract generated cryptocurrency token, wherein an execution of the transaction may include determining a price of the smart contract generated cryptocurrency token based on a reserve of an other cryptocurrency token; the secure ledger network may include at least one computer that may include at least one hardware processor; receiving by the secure ledger network, a digital signature; verifying the authenticity of the digital signature; verifying the code of the smart contract; updating a secure ledger maintained by the secure ledger network with the smart contract; receiving, by the secure ledger network, a request to execute a transaction related to the smart contract generated cryptocurrency token; and performing the transaction by executing, by the secure ledger network, the smart contract.

There may be provided a method for executing transactions by a secure ledger network, the method may include receiving, by the secure ledger network, a request to validate a smart contract that determines at least one rule for performing a transaction related to a first cryptocurrency token, wherein an execution of the transaction may include determining a price of the first cryptocurrency token based on a status of the first cryptocurrency token, and a status of an other token; the secure ledger network may include at least one computer that may include at least one hardware processor; receiving by the secure ledger network, a digital signature; verifying the authenticity of the digital signature; verifying the code of the smart contract; updating a secure ledger maintained by the secure ledger network with the smart contract; receiving, by the secure ledger network, a request to execute a transaction related to the first cryptocurrency token; and performing the transaction by executing, by the secure ledger network, the smart contract.

There may be provided a method for executing transactions by a computer of a secure ledger network, the method may include receiving, by the computer of the secure ledger network, a request to execute a transaction related to a first cryptocurrency token; and receiving, by the computer of the secure ledger network, a request to verify a digital signature; verifying, by the computer the authenticity of the digital signature; performing the transaction by executing, by the computer of the secure ledger network, a smart contract that was validated by the secure ledger network; wherein the smart contract determines at least one rule for performing a transaction related to the first cryptocurrency token, wherein an execution of the transaction may include determining a price of the first cryptocurrency token based on a status of the first cryptocurrency token, and a status of an other token; wherein the computer may include at least one hardware processor; and updating the secure ledger about a completion of the transaction.

There may be provided a method for executing transactions involving a smart contract generated cryptocurrency token by a computer of a secure ledger network, the method may include receiving, by the computer of the secure ledger network, a request to execute a transaction related to a first cryptocurrency token; and performing the transaction by executing, by the computer of the secure ledger network, a smart contract that was validated by the secure ledger network; wherein the smart contract determines at least one rule for performing a transaction related to the smart contract generated cryptocurrency token, wherein an execution of the transaction may include determining a price of the smart contract generated cryptocurrency token based on a reserve of an other token; wherein the computer may include at least one hardware processor; and updating the secure ledger about a completion of the transaction.

There may be provided a computer implemented method for executing transactions by a computer of a secure ledger network, the computer implemented method may include receiving, by the computer of the secure ledger network, a request to execute a transaction related to a first cryptocurrency token, the first cryptocurrency token is associated with an other token; and performing the transaction by executing, by the computer of the secure ledger network, a smart contract that was validated by the secure ledger network; wherein the smart contract determines at least one rule for performing the transaction related to the first cryptocurrency token, wherein an execution of the transaction may include determining a price of the first cryptocurrency token based on a balance (Bl) of the first cryptocurrency token, a total supply (Ts) of the first cryptocurrency token and a linking parameter (C) than links the first cryptocurrency token to the other token.

There may be provided a method for evaluating a Token, wherein a Reserve amount of the underlying Token is constantly maintained, this reserve amount being a certain percentage of total Tokens in Circulation.

The method for evaluating a Token comprises the steps of:

a. retrieving Token state parameters from blockchain including Total Tokens in Circulation, Total Reserve, and Reserve Ratio Constant;
b. determining said Token price in terms of underlying Token using said state parameters.
c. Determining the Token price is done by dividing number of underlying tokens in reserve by the product of Total Tokens in Circulation and the Reserve Ratio Constant.

It is apparent to a person of average skill in the art that the inventive method allows determining the Token's value without reliance on a transaction between two willing parties.

As mentioned above, smart contract enabled virtual currency networks allow creating any type of Token including Tokens with a reserve in yet another Token. Such may be referred to as 'hierarchical Tokens'. The inventive method therefore allows evaluating such hierarchical Tokens by pricing a descendant Token in terms of any ancestor Token.

This method further allows comparing the values of 2 descendant Tokens that are branched from the same ancestor Token without reliance on a transaction between two willing parties.

The present invention further provides a method for exchanging Tokens comprising the steps of:

a. indicating a held Token type and amount for exchange.
b. indicating requested Token type.
c. retrieving state parameters of held Token and requested Token from blockchain including Total Tokens in Circulation, Total Reserve, and Reserve Ratio Constant.
d. Determining the relation of said held and requested token types.
e. if said held Token is a descendant of said requested Token, exchanging held Token for its underlying Token, repeating step until exchanging for said requested Token.
f. if said requested Token is a descendant of held said Token, exchanging said held Token for following Tokens until exchanging for said requested Token.
g. if said requested Token and held Token are branched, determining a mutual ancestor Token type for said held Token type and said requested Token type. exchanging said held Token for its underlying Token, repeating step until exchanging for said mutual ancestor Token. Exchanging said mutual ancestor for following Tokens 520 until exchanging for said requested Token.

BRIEF DESCRIPTION OF THE DRAWINGS

Embodiments and features of the present invention are described herein in conjunction with the following drawings.

DETAILED DESCRIPTION OF PREFERRED EMBODIMENTS

Figure 1:
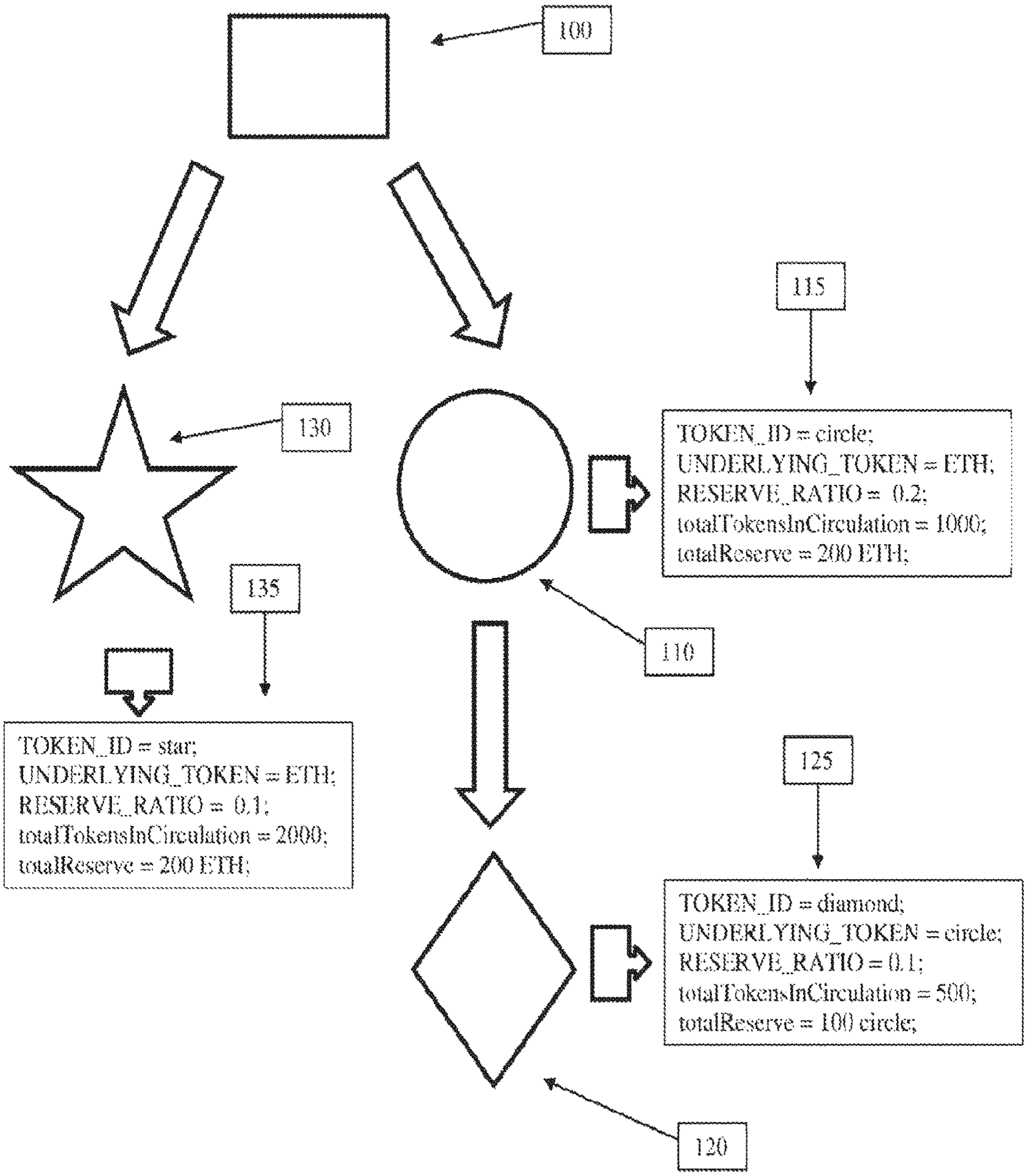
FIG. 1 depicts a Token configuration compliant with methods of the present invention.

The present invention will be understood from the following detailed description of preferred embodiments, which are meant to be descriptive and not limiting. For the sake of brevity, some well-known features, methods, systems, procedures, components, and so on, are not described in detail.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms processor and hardware processor are used in an interchangeable manner. A hardware processor may include one or more integrated circuits, a part of an integrated circuit, one or more cores, one or more central processing units, one or more graphic processor, one or more field programmable gate array, one or more ASIC, one or more hardware accelerator, and the like. The hardware processor may belong to a computer a server, a desktop computer, a mining facility, and the like.

Any memory device may include one or more integrated circuits, a part of an integrated circuit, a volatile memory, a non-volatile memory, and the like.

A computer system may include one or more computers.

A node may include one or more processors, one or more memory units, one or more computers, and the like.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference to "having", "including" or "comprising" should be applied mutatis mutandis to "consisting" and/or "consisting essentially of". For example a method that illustrated as including certain steps may include additions steps, only the certain steps of almost only the certain steps.

Referring initially to FIG. 1. Presented is an exemplary Token configuration for use with methods of the present invention. Token types 110, 120, 130 are all descendents of the virtual currency used in the virtual currency networks. Star Token 130 and circle Token 110 descend from ETH virtual currency 100. Diamond Token 120 descends from circle Token 110.

Each Token type has a set of parameters 115, 125. Such parameters are comprised of:

a. TOKEN_ID is a unique identifier for the Token type.
b. UNDERLYING_TOKEN represents the Token type used as a reserve for this Token type. This parameter can be a Token type comprising same parameters as this Token type or the virtual currency used in the currency network (e.g. ETH).
c. totalTokensInCirculation represents the total number of Tokens of this Token type currently circulating the network.
d. totalReserve represents number of Tokens of UNDERLYING_TOKEN type held currently in reserve.

Consider the circle Token type parameters 115. As can be seen the Token identifier is circle. Reserve is held in ETH. and currently 200 ETH are held in reserve. There are 1000 issued circles currently held by various users in the Ethereum network. Further, a reserve ratio of 0.2 is maintained between total circles in network and total ETH held in reserve.

Now consider the diamond Token type parameters 125. As can be seen the Token identifier is diamond. Its reserve is held in circles. Currently 100 circles are held in reserve. There are 500 issued diamonds currently held by various users in the Ethereum network. Further, a reserve ratio of 0.1 is maintained between total diamonds in network and total circles held in reserve.

We now turn to star Token type parameters 135. As can be seen the Token identifier is star. Reserve is held in ETH. Currently 200 ETH are held in reserve. There are 2000 issued stars currently held by various users in the Ethereum network. Further, a reserve ratio of 0.1 is maintained between total stars in network and total ETH held in reserve.

It is to be understood that Token types can be implemented in various ways with various parameters. The above list merely represents a single implementation that is suitable for use with methods of the present invention.

Figure 2:
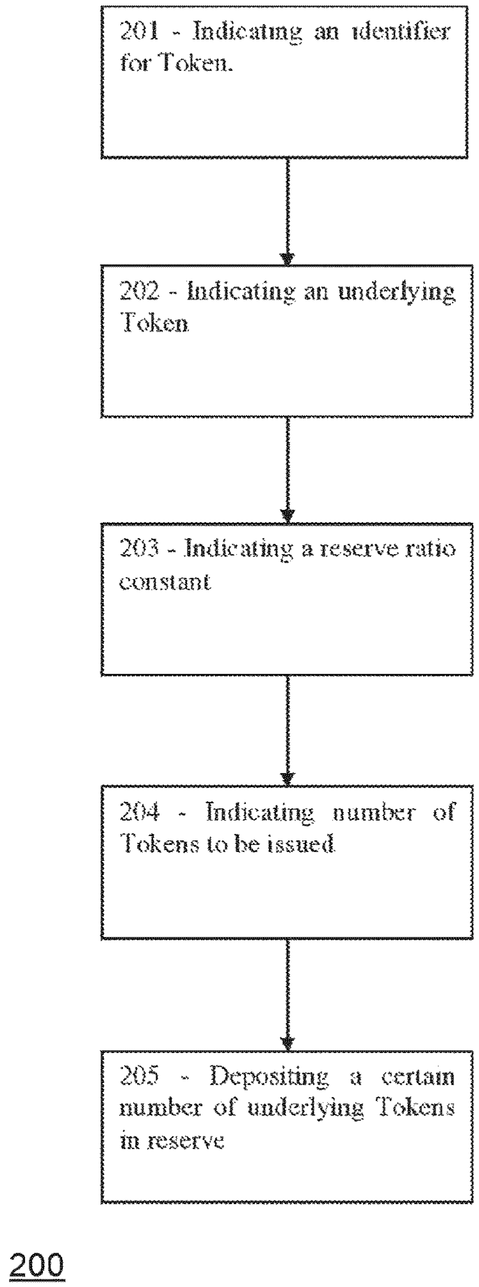
FIG. 2 shows a flowchart of a method for issuing Tokens compliant with methods of the present invention.

We now refer to FIG. 2, which depicts an exemplary method 200 for issuing a Token compliant with methods of the present invention. The method comprises the steps of:

a. Indicating an identifier for the Token type (e.g. circle) 201.

b. Indicating an underlying Token for Reserve (e.g. ETH) 202.

c. Indicating a reserve ratio constant (e.g. 0.2) 203.

d. Indicating number of Tokens to be issued of this Token type (e.g. 1000) 204;

Depositing a certain number of underlying Tokens in reserve 205. This number is determined by multiplying the reserve ratio constant by number of Tokens to be issued. If 1000 circles are to be issued, 200 ETH should be deposited.

Figure 3:
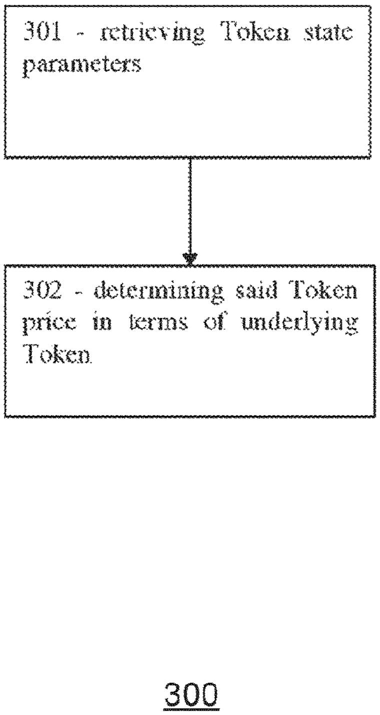
FIG. 3 is a flowchart depicting a method for evaluating a Token in terms of its underlying token.

Referring now to FIG. 3. Depicted is a method 300 for evaluating a Token type in terms of its underlying Token type with the steps of:

a. retrieving Token state parameters from blockchain including Total Tokens in Circulation, Total Reserve, and Reserve Ratio Constant.

b. determining said Token price in terms of underlying Token using said state parameters.

Following is a formula for determining said price:

$$Tp = \frac{Tr}{Tt * Rr}$$

Wherein a. Tr=Total Reserve in underlying Tokens;

b. Tt=Total Tokens in circulation;

c. Rr=Reserve Ratio Constant.

d. Tp=price of this Token in terms of underlying Token.

For example: determining the price of a circle Token 110 in terms of ETH 100:

$$Tp = \frac{200}{1000 * 0.2} = 1$$

In this example, a circle is worth 1 ETH.

Figure 4:
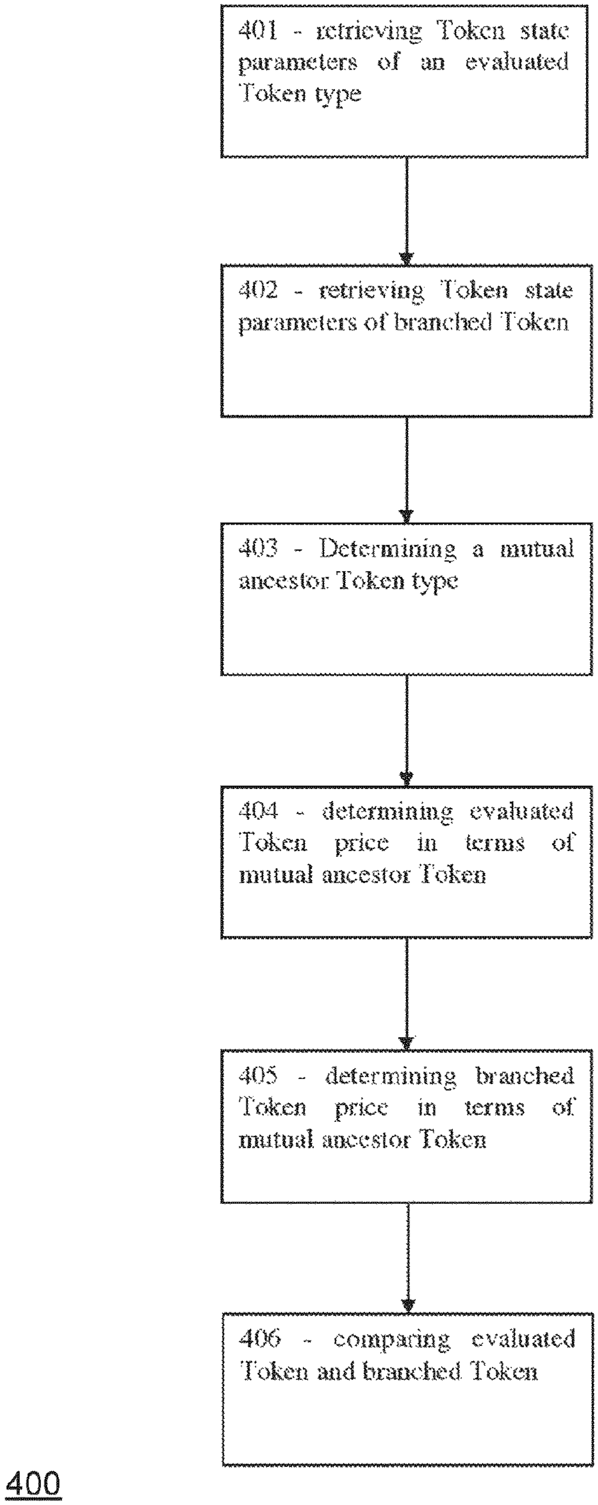
FIG. 4 is a flowchart depicting a method for evaluating a Token in terms of a branched token.

Referring now to FIG. 4. Depicted is a method 400 for evaluating a Token type in terms of a branched Token type with the steps of:

a. retrieving Token state parameters of an evaluated Token type from blockchain including Total Tokens in Circulation, Total Reserve, and Reserve Ratio Constant 401.

b. retrieving Token state parameters of said branched Token type from blockchain including Total Tokens in Circulation, Total Reserve, and Reserve Ratio Constant 402;

c. Determining a mutual ancestor Token type for said evaluated Token type and said branched Token type 403.

d. determining said evaluated Token price in terms of its mutual ancestor Token using said evaluated Token state parameters 404. This step may be completed in such a manner that the evaluated Token is determined in terms of its underlying Token, afterwards the price of said underlying Token is determined in terms of its own underlying Token. This process is repeated until the mutual ancestor Token is reached.

e. Determining said branched Token price in terms of its mutual ancestor Token using said branched Token state parameters 405.

f. comparing evaluated Token and branched Token in terms of said mutual ancestor Token 406.

For example, if a diamond is worth 2 circles, a circle is worth 4 ETH, and a star is worth 2 ETH, a diamond is worth 8 ETH, and star is worth 2 ETH. A diamond therefore, is worth 4 stars.

Figure 5:
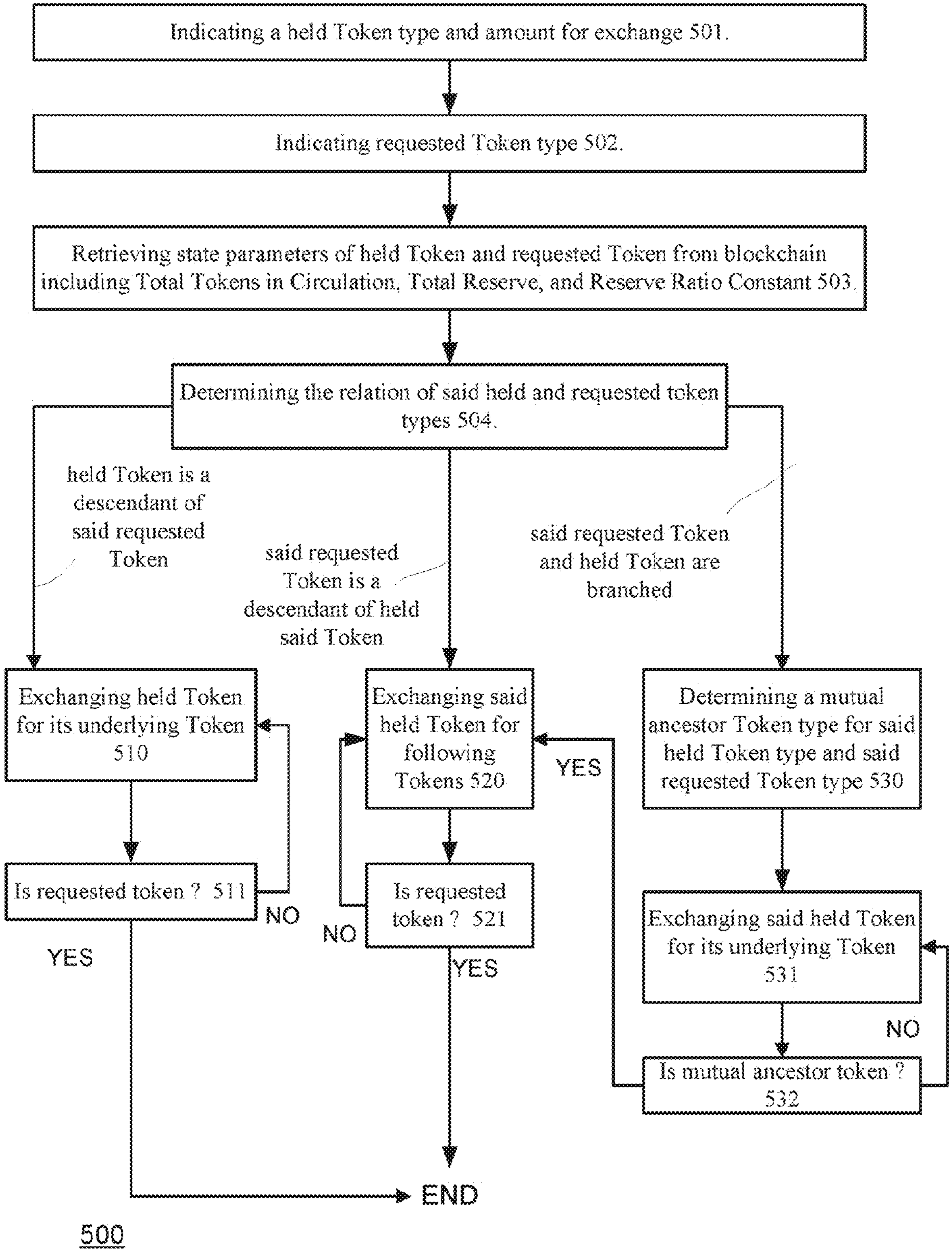
FIG. 5 is a flowchart depicting a method of exchanging a descendent Token for an underlying Token.

Referring now to FIG. 5. Depicted is a method 500 for exchanging Tokens comprising the steps of:

a. Indicating a held Token type and amount for exchange 501.

b. Indicating requested Token type 502.

c. Retrieving state parameters of held Token and requested Token from blockchain including Total Tokens in Circulation, Total Reserve, and Reserve Ratio Constant 503.

d. Determining the relation of said held and requested token types 504.

e. if said held Token is a descendant of said requested Token, exchanging held Token for its underlying Token 510, repeating step 510 until (see step 511) exchanging for said requested Token.

f. if said requested Token is a descendant of held said Token, exchanging said held Token for following Tokens 520 until (see step 521) exchanging for said requested Token.

g. if said requested Token and held Token are branched, determining a mutual ancestor Token type for said held Token type and said requested Token type 530. exchanging said held Token for its underlying Token 531, repeating step until (see step 532) exchanging for said mutual ancestor Token. Exchanging said mutual ancestor for following Tokens 520 until exchanging for said requested Token.

Figure 6:
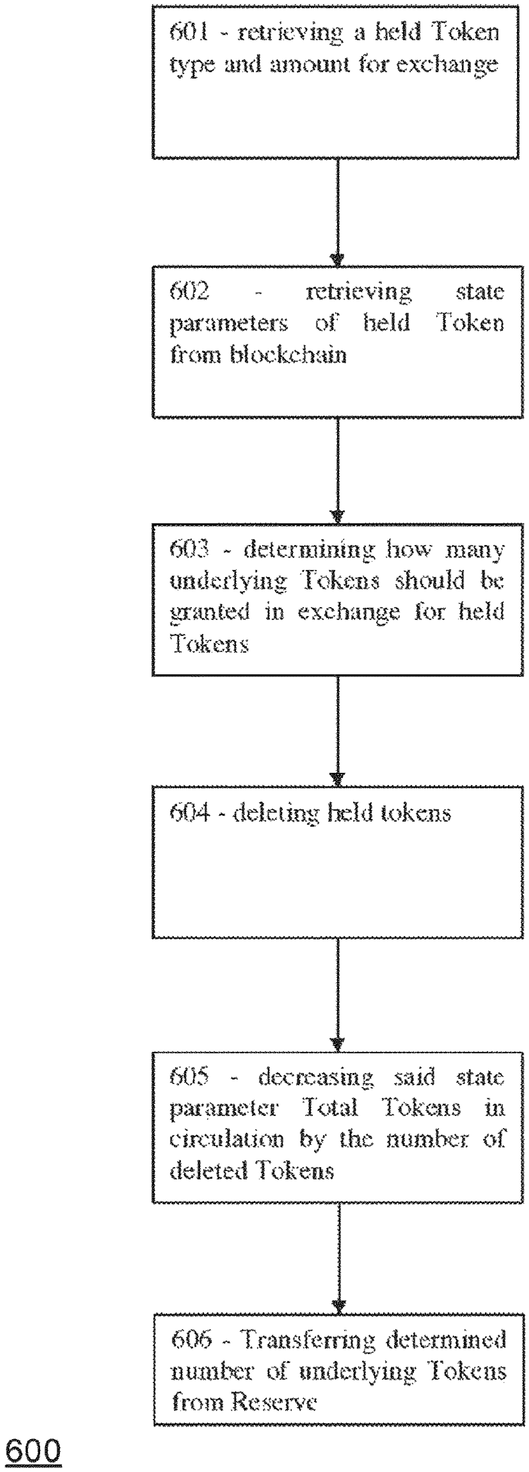
FIG. 6 is a flowchart depicting a method for exchanging a held Token for its underlying Token.

FIG. 6. depicts a method 600 for exchanging a held Token for its underlying Token, comprising the steps of:

a. retrieving a held Token type and amount for exchange 601.

b. Retrieving state parameters of held Token from blockchain including Total Tokens in Circulation, Total, and Reserve Ratio Constant 602.

c. determining how many underlying Tokens should be granted in exchange for held Tokens 603.

d. Deleting held tokens 604.

e. decreasing said state parameter Total Tokens in circulation by the number of deleted Tokens 605.

f. transferring determined number of underlying Tokens from Reserve 606.

Following is a formula for determining how many underlying Tokens should be granted in exchange for held Tokens:

$$Ut = \left| Tr * \sqrt[Rr]{1 + \frac{-Ht}{Tt}} - Tr \right|$$

Wherein:

a. Tr=Total Reserve of underlying Token;
b. Tt=Total Tokens in circulation;
c. Rr=Reserve Ratio Constant.
d. Ht=Number of held Tokens for exchange
e. Ut=Number of underlying Tokens to be received.

For example: determining how many ETH should be issued upon exchanging 20 Circles, given a reserve of 200 ETH, 1000 circles in circulation, and a reserve ratio of 0.2:

$$Ut = \left|200 * \sqrt[0.2]{1 + \frac{-20}{1000}} - 200\right| = 19.215$$

In this example, by selling 20 circles, a user shall receive 19.215 ETH deducted from the reserve.

Figure 7:
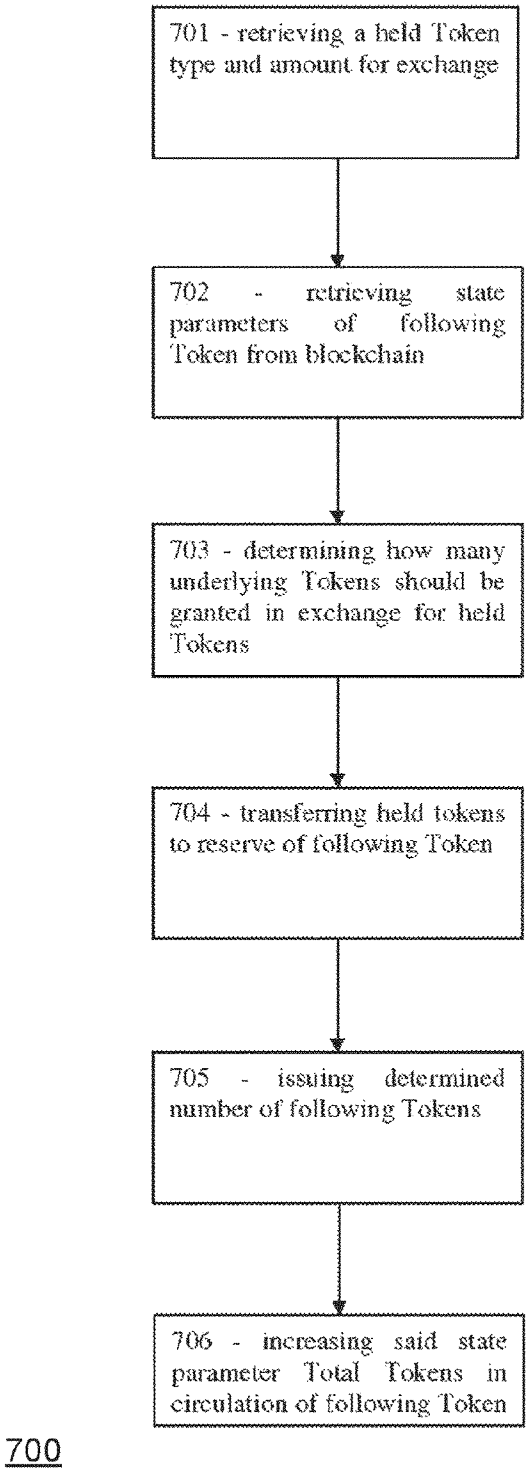
FIG. 7 is a flowchart depicting for exchanging held Token for its following Token.

FIG. 7. Depicts a method 700 for exchanging held Token for its following Token, comprising the steps of:

a. retrieving a held Token type and amount for exchange 701.
b. retrieving state parameters of following Token from blockchain including Total Tokens in Circulation, Total, and Reserve Ratio Constant 702.
c. determining how many following Tokens should be granted in exchange for held Tokens 703.
d. transferring held tokens to reserve of following Token 704.
e. issuing determined number of following Tokens 705.
f. increasing said state parameter Total Tokens in circulation of following Token type by the number of issued Tokens 706.

Following is a formula for determining how many underlying Tokens should be granted in exchange for held Tokens:

$$Ft = \left|Tt * \left(1 + \frac{Ht}{Tr}\right)^{Rr} - Tt\right|$$

Wherein:

a. Tr=Total Reserve of underlying Token;
b. Tt=Total Tokens in circulation;
c. Rr=Reserve Ratio Constant.
d. Ht=Number of held Tokens for exchange
e. Ft=Number of following Tokens to be issued.

For example: determining how many circles should be issued upon exchanging 20 ETH, given a reserve of 200 ETH, 1000 circles in circulation, and a reserve ratio of 0.2:

$$Ft = 1000 * \left(1 + \frac{20}{200}\right)^{0.2} - 1000 = 19.244$$

In this example, by selling 20 ETH, a user shall receive 19.244 circles.

The following description will refer to the implementation of mentioned above methods using smart contracts.

A computer, network, or blockchain, may deploy a smart contract. A smart contract is computer code that implements transactions of a contract. The computer code may be executed in a secure platform (e.g., an Ethereum platform) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes initializing the smart contract and its state. The state of a smart contract is stored persistently in the blockchain (e.g., via a Merkle tree). When a transaction is recorded against a smart contract, a message is sent to the smart contract and the computer code of the smart contract executes to implement the transaction (e.g., debit a certain amount from the balance of an account). The computer processes the code and ensures that all the terms of the contract are complied with before the transaction is recorded in the blockchain. For example, a smart contract may request an exchange of one type of cryptocurrency token to another. The computer executes code to determine the exchange rate and transfers the correct amount of tokens to and from the correct accounts.

Figure 8:
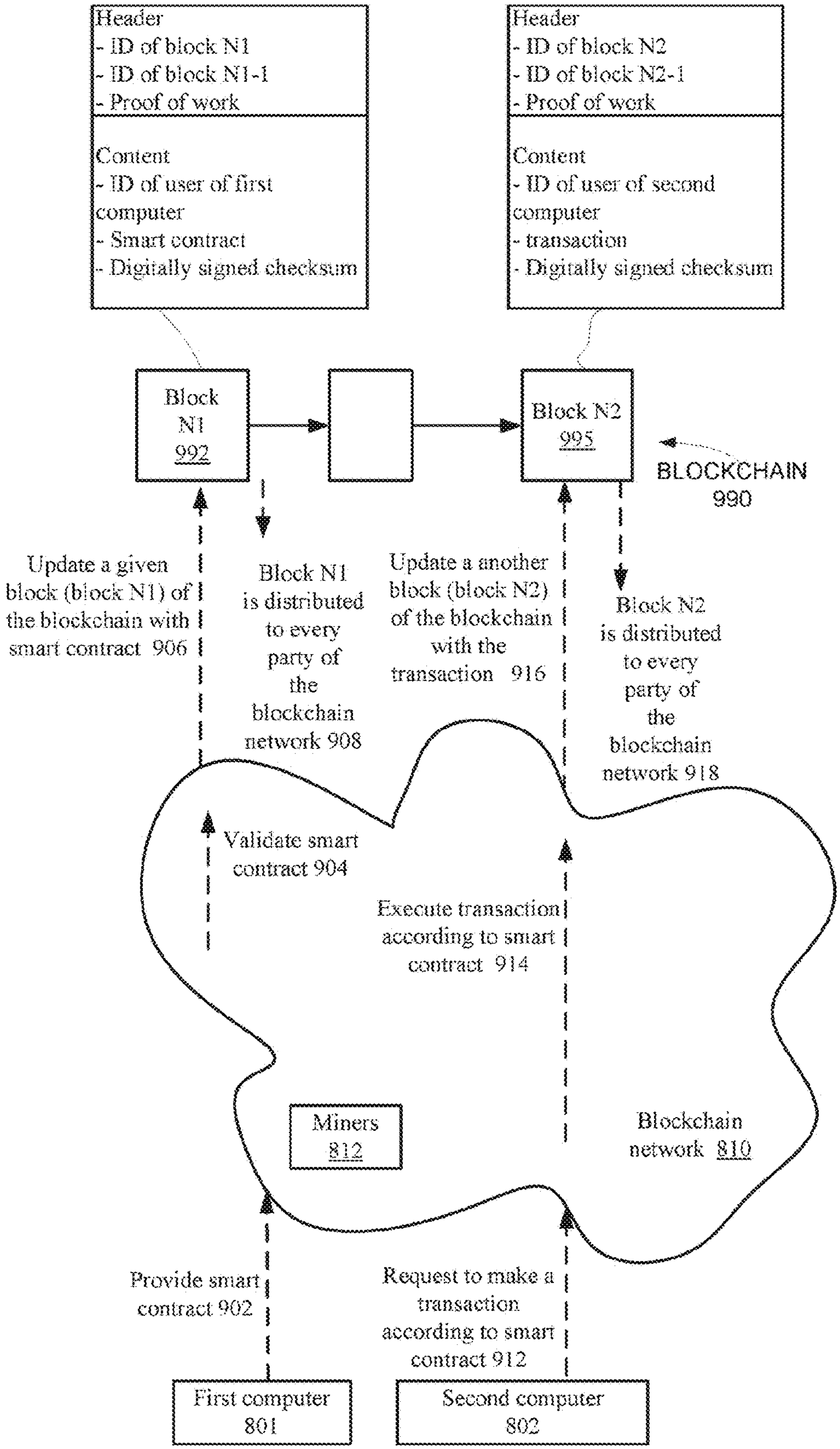
FIG. 8 illustrates an example of a blockchain, a blockchain network, a first computer and a second computer.

FIG. 8 illustrates a blockchain 990, a blockchain network 810, a first computer 801 and a second computer 802.

Each one of the first and second computers 801 and 802 may belong to the blockchain network 810 or may not belong to the blockchain network.

The blockchain network may include multiple computers, networks, links, and databases. It is illustrated as including miners 812.

Miners may manage the blockchain, whereas the managing may include, for example, validating a smart contract and/or transactions according to the smart contract, updating the blockchain with a validated smart contract and update the blockchain with a transaction that is executed according to the smart contract, determine that a suggested smart contract is invalid, determine that a transaction is not according to a smart contract, and the like.

In some embodiments, a smart contract may be accompanied by a digital certificate, or a digital signature which contains information regarding the source of the transaction. The computer, network, or blockchain will validate this information and determine the authenticity of the source of the transaction prior to deploying the smart contract.

The smart contract may determine the rules for evaluating a token price and an initial status of the token (such as the reserve of the token) and any other rules that should be applied during a transaction. For example, at least some of the rules for evaluating a token price may be included in method 200. The rules for evaluating the token price may include rules for representing a token type in terms of a branched Token type.

Transactions that are executed according to the smart contract may follow each one of methods 300, 400, 500, 600, 700, 1300 and 1400. One or more smart contracts may include any combination of any steps of methods 300, 400, 500, 600, 700, 1300 and 1400. The smart contract may be uploaded to the secure ledger in any manner—for example by executing method 1100 and/or 1200.

FIG. 8 also illustrates a method that includes:

a. Providing (902) by first computer 801 a smart contract that determines the rules for evaluating a token price and an initial status of the token.
b. Validating (904) the smart contract by the blockchain network. If the smart contract is not valid the process ends.
c. Updating (906) by the blockchain network a given block of the blockchain (for example block N1) with the smart contract.
d. Distributing (908) block N1 to every party of the blockchain network (this may include distributing block N1 to the first and/or second computers 801 and 802).
e. Sending (912) to the blockchain network by second computer 802 a request to make a transaction according to the smart contract.

f. Executing (914) the transaction according to the smart contract by the blockchain network. It is assumed that the executing includes validating the request and only when the request then continuing with the execution of the transaction. The executing may include selling or buying a token according to any of the methods 200-700 to provide, at the end of a transaction updated price of the token and updated reserves of the token and another token (such as the Ether) that was involved in the transaction.

g. Updating (916) by the blockchain network another block of the blockchain (for example block N2) with the transaction.

h. Distributing (918) block N2 to every party of the blockchain network (this may include distributing block N2 to the first and/or second computers 801 and 802).

It should be noted that the first computer 801 may perform transactions, that the same block may be updated to reflect multiple transactions, that transactions can be executed by one or more miners, and the like.

The creation of a smart contract may include:

a. Generate the smart contract using a language such as Solidity.

b. Compile the smart contract to get a binary smart contract.

c. Deploy the compiled smart contract (binary file) to the network. The deployment can cost an Ether. The deployment includes getting back the smart contract blockchain address and ABI The contract may be called (in order to execute transactions)—for example using a dedicated Javascript API.

See, for example "A 101 Noob Intro to Programming Smart Contracts on Ethereum"

Ethereum is merely a non-limiting example of an infrastructure that can support the mentioned above method.

The mentioned above conversion method is transparent (As it can be viewed by various (usually all) participants of the blockchain network (and even other computers that are coupled to the blockchain network) smart contracts in a blockchain network in which the content of the smart contract and any transaction according to the smart contracts), and dramatically reduces the computer resources that should allocated with the transactions between different coins, and provides a robust system for currency exchange (as it does not have a single point of failure).

There may be provided a network (referred to as a Bancor network) that may relay on the Ethereum network (such as illustrated in FIG. 8) or on another infrastructure.

There may be provided a network (also referred to as the Bancor network) that is a Decentralized Currency Network. It is a contract-based ecosystem for token exchange. Bancor-enabled tokens introduce a new model for price discovery and market liquidity. Exchange rates are calculated by the contract, which offers a standard API for immediate conversions to other tokens held by the contract for that purpose.

Traditional exchanges perform three primary functions: Process Deposits and Withdrawals, Maintain Order Book and Matchmake Transactions.

The participants in the ecosystem are the platform and the traders. Bancor proposes a radically different ecosystem.

Bancor works with any token—so deposits and withdrawal are handled in a decentralized fashion by any asset tokenizers that wish to participate (such as Digix).

In an exchange, the order book establishes the market depth which provides market liquidity for the traded assets. With Bancor the liquidity is provided from a reserve held by a smart-contract, rather than from a 3rd party, a method which avoids the Coincidence of wants problem (CoW). The CoW problem was addressed by the invention of writing—for communication, and by the invention of currencies—for trade, however, it was never addressed for currency trading since the required technology (or trust) was not available, until recently. The possibility of anyone to create a digital token which holds reserves with a set of immutable instruction on how to offer conversion between itself and the reserve—is what allows holders to convert from one token to the other—without needing a simultaneous 3rd party to trade with, solving the CoW problem.

In an exchange, the price of an asset is the currently best priced order(s) in the book. With Bancor, the value of an asset is continuously calculated by the smart-contract, increasing its value with each conversion to the token, and decreasing the value when the token is converted to another. In this model, traders participation becomes optional, rather than a requirement for convertibility.

Bancor-enabled tokens may use a simple method to calculate their price. The price is denominated in the reserve token (e.g. Ether). The reserve which is held by a token has a predefined "Constant Reserve Ratio (CRR)"-CRR is the ratio between the reserve balance and the token market cap. The token unit price is therefore calculated in the following way: Unit-Price=Reserve-Balance/(CRR*Token-Supply)

Bancor-enabled token (BET) are self-issued whenever a user converts the reserve token to the BET, an action which increase BET reserve balance. BETs are also self-destroyed, whenever a user converts the BET to a token held in its reserve.

BET may hold more than one reserve and by that become a gateway between the different tokens held in the BET's reserves (which could be ETH). Converting between reserve tokens become possible, where with each conversion, the converted—from token price is decreasing, and the converted-to token price is increasing. This provides a financial incentive for arbitrage bots to participate and rebalance the rates to match external market prices.

ETH-Bancor is a the Ethereum blockchain "root token", which holding its reserve in Ether and, designed to be used by other user-created Bancor tokens as their reserve tokens a reserve token, by other user-created Bancor tokens. In this way, every token backed by it, directly or indirectly, gain ins value as when the network grows. Holding ETH-Bancor is in that sense an investment in the future success of Bancor ecosystem on the Ethereum blockchain. The ETH-Bancor "root token" functions as an Ether gateway for all the Ethereum Bancor Network tokens, enabling each token backed by it, directly or indirectly, to be converted to Ether at market-value.

The Bancor Ecosystem

Due to recent technological advancement, namely the emergence of smart-contract blockchains, token conversion and price discovery can be done using a radically more efficient model, as explained in this white paper. The cost and effort required for a token to reach a state of strong liquidity, are usually quite substantial, given that liquidity is only reached at a point where a critical mass of traders are constantly active in the exchange. Bancor reduces these costs to zero by providing a "built-in liquidity" solution, and by that, enabling the long tail of convertible tokens.

The long tail of tokens is a three-tier ecosystem. Most online ecosystems include only two tiers-platform and end-users.

Three-tier ecosystems also include the middle tier "super-users" (e.g. Wikipedia Admins, Subreddit Mods, Facebook Group Admins), who create and moderate topic-related online destinations, that are utilized by the end-users to interact with one another.

The Bancor three-tier ecosystem includes the platform tier, the token-creators tier (super-users) and the token users tier (end-users). The creators are using the platform to issue tokens which may be used by end-users to trade with each other. The end-users are the direct customers of the token creators, who are the direct customers of the Bancor platform The Bancor Platform The Bancor Platform may include:

a. Backend: Hosting Blockchain-on which the tokens and smart contracts are hosted (e.g. Ethereum/RSK)

b. Smart Contract Functions: Calculate conversion rates and offer the token conversion service for the tokens in the Bancor Network.

c. Frontend: The user-facing interface (UI) to retrieve information and execute transactions, using HTML, chat-bots, mobile apps, etc.

The Backend

The Bancor Network can operate on top of any smart-contract enabled blockchain. Initially, Bancor will operate only on top Ethereum. As other smart-contracts platform are released, Bancor "root tokens" will be issued for all popular platforms (e.g. "Bitcoin-Bancor" on RootStock)

Bancor Smart Contract Functions and Parameters

With Bancor, price discovery and token conversion functions are handled directly by each token's own smart contract, which: Maintains balance in one or more pre-defined "reserve" tokens, offers a bi-directional conversion service between the token and its reserves and Re-calculates the token's conversion rates (=value) following each conversion.

Figure 9:
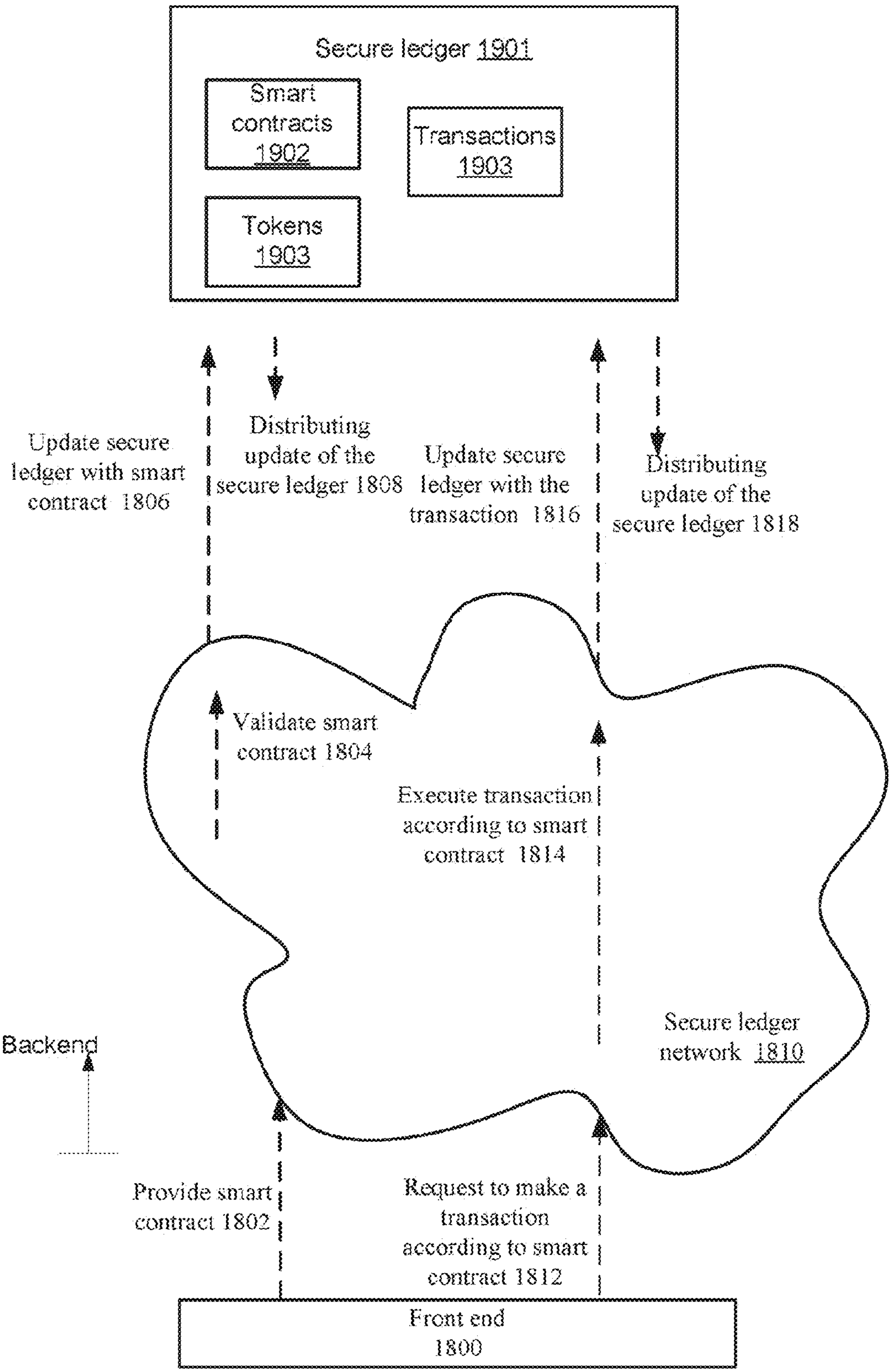
FIG. 9 illustrates a secure ledger, a secure ledger network and frontend.

FIG. 9 illustrates a secure ledger 1901, a secure ledger network 1810, and frontend 1800.

The secure ledger 1901, a secure ledger network 1810, and frontend 1800 and form the Bancor platform.

The front end 1800 may include one or more computers.

The secure ledger network 1810 may include multiple computers, networks, links, and databases.

The secure ledger 1901 may be a distributed secure ledger 1901, a blockchain, a non-distributed secure ledger, or any other type of ledger that is secure enough.

The secure ledger can be managed by one or more computers, whereas the managing may include, for example, validating a smart contract and/or transactions according to the smart contract, updating the blockchain with a validated smart contract and update the blockchain with a transaction that is executed according to the smart contract, determine that a suggested smart contract is invalid, determine that a transaction is not according to a smart contract, and the like.

The smart contract may determine the rules for evaluating a token price and an initial status of the token (such as the reserve of the token) and any other rules that should be applied during a transaction. For example, at least some of the rules for evaluating a token price may be included in method 200. The rules for evaluating the token price may include rules for representing a token type in terms of a branched Token type.

Transactions that are executed according to the smart contract may follow each one of methods 300, 400, 500, 600 and 700.

FIG. 9 also illustrates a method that includes:

a. Providing (1802) by front end 1800 a smart contract that determines the rules for evaluating a token price and an initial status of the token.

b. Validating (1804) the smart contract by the secure ledger network. If the smart contract is not valid the process ends.

c. Updating (1806) by the secure ledger with the smart contract.

d. Optionally distributing (1808) the updated secure (this may include distributing the updated secure ledger to the front end).

e. Sending (1812) to the secure ledger network by frontend a request to make a transaction according to the smart contract.

f. Executing (1814) the transaction according to the smart contract by the secure ledger network. It is assumed that the executing includes validating the request and only when the request then continuing with the execution of the transaction. The executing may include selling or buying a token according to any of the methods 200-700 to provide, at the end of a transaction updated price of the token and updated reserves of the token and another token (such as the Ether) that was involved in the transaction.

g. Updating (1816) by the secure ledger network the secure ledger with the transaction.

h. Optionally distributing (1818) the updated secure ledger.

Token Conversion Parameters

A Bancor network token may have the following predefined parameters:

a. Reserve token (A Bancor token, or Ether)—the token which is held in the reserve, and in which the token price is denominated b. Constant Reserve Ratio (CRR)—This parameter establishes the constant ratio between the reserve balance and the market cap. This means that the market cap of a token with a CRR of 20%—is set as the token's reserve balance times five. Therefore, each unit price is calculated by dividing the market cap in the token supply.

c. Obtain the initial balance in the reserve token in order to provide a conversion service between the token and the reserve. The initial reserve can be obtained through a crowd sale, or a direct deposit.

Figure 10A:
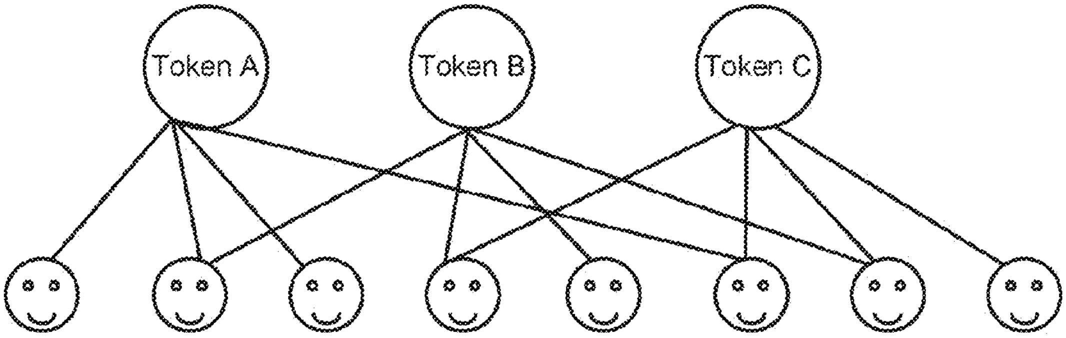
FIGS. 10A and 10B illustrate relationships between users and various tokens.
Figure 10B:
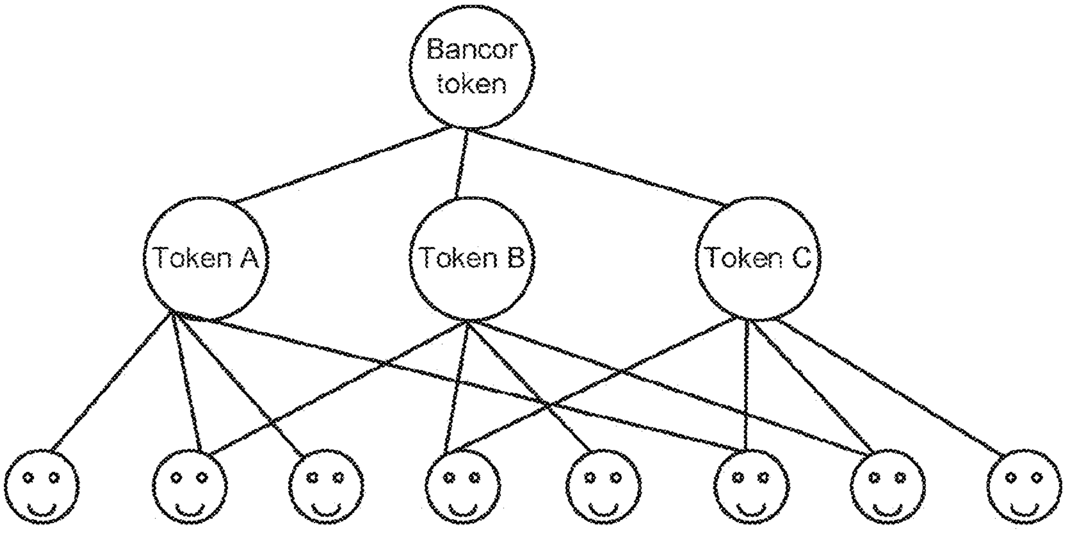

The reserve holdings establish the inter-token relationships in the Bancor Network, and provide a "built-in" solution for token conversion, as visualized in FIGS. 10A and 10B.

Token Conversion Service

The reason a reserve is held, is in order to allow the token to offer a conversion service between itself and the reserve token, using a variable conversion rate. This means that tokens are purchased directly from the token's smart contract, by sending the reserve token (e.g. Ether) which is added to the token's reserve, triggering issuance of newly minted tokens to the buyer.

Tokens may be converted back to the reserve token (sold), by sending the tokens to the contract, which destroys these tokens and sends parent tokens from the reserve to the seller in return.

Conversion Rate Re-Calculation (CRR)

When a token is purchased, the payment is added to the reserve balance, the token supply increases (due to the issuance to the buyer), and the price increases since the reserve is fractional, only a fraction of the payment is required to cover the newly issued tokens while the payment for the purchase, in the reserve token, is not (see, for example, the mentioned above equations).

In contrast, when tokens are sold—the reserve balance, token supply and the token value are decreased.

Each token in the Bancor Network is created with zero initial tokens, and a standard predetermined parameter-Constant Reserve Ratio (e.g. 10%), by which its price is calculated as follows:

$$\text{Market Cap} = \text{Reserve Token Balance} / \text{Constant Reserve Ratio}$$

$$\text{Conversion Rate} = \text{Market Cap} / \text{Token Supply}$$

Both the Market Cap and Conversion Rate may be denominated in the reserve token.

These dynamics reach an equilibrium at the price point where the conversions to and from a token, are balanced—constituting a price discovery process. The Constant Reserve Ratio directly affects the price volatility, since the fluctuation in the token value, following each conversion, would be less drastic for tokens with higher constant reserve ratio.

The Issuers (Super Users) of the Bancor Ecosystem

The super-users (or "Issuers") are the direct users of the platform, issuing tokens which are Bancor-enabled, which end-users can then purchase, hold, transfer and sell. An Issuer could be a social entrepreneur building a local currency, a small business or chain who wishes to offer a loyalty program to their customers, or a crowd sale organizer, wishing to distribute liquid tokens—rather than a limited selection of rewards. For example—the user of the first computer of FIG. 8 can be regarded as a super-user.

The issuers set the core parameters of the token upon its creation:

a. Reserve Token-a different token to be held in the reserve (e.g. ETH-Bancor or Ether).

b. Constant Reserve Ratio-ratio between the reserve balance and the token market cap (e.g. % 10)

To enable a token to be part of the Bancor network, it is required to deposit an initial reserve, in order to establish the initial token value and conversion service. The token issuer may choose to directly deposit the initial reserve for the token, or to obtain it as part of a crowd sale.

Issuers may also set additional terms and special rights that are expressed in the token's smart-contract. For example, the contract may collect transaction fees, conversion fees, or allocate tokens to different parties, with or without a timelock. Tokens can also be held in a multi-signature m-of-n account, or any other generalized smart contract.

An issuer can also create one or more "sub-tokens" which hold the issuer's token in their reserve, creating a branch in the Bancor Network, which shares a common interest.

The End Users of the Bancor Ecosystem

In three-tier models, the end-users are not direct users of the platform. Rather, they use tokens created by super-users via the platform.

There are several different ways in which end-users may use a token:

a. Accepting the token (as sellers)

b. Shopping with the token (as buyers)

c. Buying and selling the token (as holders/speculators/traders)

Use Cases

App Coins and ICOs

App Coin tokens are essentially currencies that are used in different online decentralized ecosystems. Token crowd sales are increasingly popular. Over $200,000,000 were raised in ICOs in the past 3 years. The vast majority of this amount was raised on top of the currently single smart-contract blockchain-Ethereum Ethereum itself, September 2014—$18,439,086

The DAO, May 2015—$160,000,000

ICONOMI Fund, September 2016—$10,682,516

DigixDAO, March 2016—$5,500,000

Golem, November 2016—$8,600,000

Augur, October 15—$5,133,000

FirstBlood, September 16—$6,267,767

By allocating a portion of the raised funds to the token's reserve, the token issuer guarantees that once the Crowd sale is completed, the token will be convertible to any other Bancor token (or ETH), with virtually no spread or exchange fees (unless otherwise defined by the issuer in the smart contract). The token's market value will always reflect the real demand for the token, even if it is hardly ever traded.

Today, the common practice is for App Coins and DAOs to be listed on different exchanges—in order to provide liquidity for the holders, while providing an avenue for buyers to purchase it. Shallow market-depth risk an increased price volatility and limited liquidity/supply.

For example, DigixDAO (DGD) is a DAO token which distributes to the holders their relative share of the 0.13% fee collected from a gold backed token, issued by their asset-tokenization service.

DGD tokens were issued in an ICO that took place in March 2016 and raised its $5.5 m target within twelve hours. As of now, the market cap of DGD is $17.5 m (Jan. 12, 2016), however, selling $15k worth of DGD will take the price 20% down on Bittrex, the exchange where 40% of the DGD trading takes place.

If DGD were to use Bancor using a 10% reserve, it would require keeping $550k of the ICO funds in the token's reserve. With a 10% constant reserve ratio—converting $15k worth of DGD to Ether, would reduce the price by merely 0.8% (rather than 20%). It would also make it possible to convert $150k of DGD to Ether, which is currently more than the entire market depth in all the exchange markets combined, a sale which would reduce the price by merely 7.7%.

Local Currencies

Around the world, there are three common local currency models

| | Purchasable with Fiat Currency | Convertible back to Fiat Currency |
|---|---|---|
| 1. Separated | No | No |
| 2. Purchasable | Yes | No |
| 3. Backed | Yes | Yes |

All three models typically peg their value to the national fiat currency, or to a specific unit of time ("hours"), so no process of price discovery needs to take place. The backed model is the most convenient model for businesses with hard costs, as it is the only model offering conversion back to the fiat currency. However, this model is similar in nature to a Bancor token with 100% reserve—which is essentially a "rebranded" version of the reserve token.

With Bancor, a new model for local currencies is possible. In this model, the value of the local currency will increase as more and more members acquire it. Local businesses can offer a discount for those who pay with the local currency, and may also instantly and automatically convert any portion of the payment to ETH, and in turn to dollars, in order to ensure that the hard costs are covered.

A Bancor local currency can be initiated using a crowd sale. The crowd sale funds can be used as the token's reserve, as well as for funding of different local initiatives.

For example, a local currency with a 10% reserve ratio, raises $2,500 worth of ETH-Bancor (Charging 1$ per token), then keeps $1,000 worth of ETH-Bancor in the reserve, and converts the additional $1,500 to ETH (or USD) to cover their operational costs. Since the CRR is % 10, and the reserve is $1000—the initial market cap of the currency would be $10,000. As 2,500 tokens were distributed in the Crowd sale, the local currency admin keeps the rest of the tokens (7500), which may be released for use gradually (timelock).

These tokens can be used to fund local initiatives, as well as to attract new users and businesses. For example, it can be offered as a special bonus for the first businesses giving a fixed discount for purchases made in the local currency, articles written about the new token, and development bounties.

In this model, it makes financial sense for users to acquire the local currency in order to simply enjoy the discount when purchasing in local businesses. While businesses holding the tokens (rather than converting every token to fiat) can profit from the local currency's growth.

What this model offers is a "local quantitative easing", by pooling local funds (to the token's reserve) and using it to extend credit for the local community (in the form of the local currency token). It can also be described as a "local bitcoin", which financially rewards early adopters when the usage grows, incentivizing the users to propagate it.

Loyalty Points

A Bancor token may be used as customer loyalty points. The behavior is similar to local currencies, only that it is issued by one or more businesses which promise a special discount or benefit for customers paying with it. In this model:

- Loyalty points can be purchased by customers for ETH or any other Bancor Token.
- The business may offer a fixed discount (e.g. % 10), for customers who pay with loyalty points.
- The business may convert loyalty points to Fiat in order to cover the cost-of-sale.
- Loyalty points rewards early adopters, since the value increases as more customers start leveraging the program.

The mentioned above methods may provide a highly efficient and secure transaction mechanism. Facilitating the exchange between different types of tokens allows to store different tokens state parameters and reserve in a blockchain and may simplify tokes exchange and reduces resources allocated for currency conversion.

There may be provided a method for performing transactions in a blockchain network, the method comprises: receiving by the blockchain network a smart contract that determines rules for determining a price of a token and an initial reserve of the token; validating the smart token by the blockchain network; if the smart contract is validated then updating a given block of the blockchain with the smart contract and distributing the given block of the blockchain; receiving, by the blockchain network a request to perform a transaction according to the smart contract; the transaction may include exchanging the token by another token; validating the request; and if the request is validated that performing the transaction, updating a certain block of the blockchain with the transaction and distributing the certain block of the blockchain.

The transaction may include determining the price of the token, performing the transaction according to the price of the token and updating the reserve of the token and of the other token.

For example—the smart contract may determine rules that determine the price of the token based on token state parameters.

The token state parameters may include a total number of the other token in circulation (in the blockchain), total reserve of the token, and reserve ratio constant.

The total reserve of the token may be maintained as a certain percentage of an amount of the other tokens in circulation.

The price of the token may be a function of a division of the number of other tokens in reserve by the product of total tokens in circulation and said reserve ratio constant.

The transactions may be executed according to any of the methods of any of the previous figures.

There may be provided a method for performing transactions in a blockchain network, the method comprises: receiving, by the blockchain network a request to perform a transaction according to a smart contract that determines rules for determining a price of a token and an initial reserve of the token; the transaction may include exchanging a token by another token; validating the request; if the request is validated that performing the transaction, updating a certain block of the blockchain with the transaction and distributing the certain block of the blockchain.

The transaction may include determining the price of the token, performing the transaction according to the price of the token and updating the reserve of the token and of the other token.

There may be provided a method for performing transactions in a blockchain network, the method may include sending, by a computer and to a blockchain network a request to perform a transaction according to a smart contract that determines rules for determining a price of a token and an initial reserve of the token; the transaction may include exchanging the token by another token; and receiving, by the computer and from the blockchain network, an updated certain block of the blockchain that reflects the transaction.

These mentioned above methods can be applied for any secure ledger network and any secure ledger.

Figure 11:
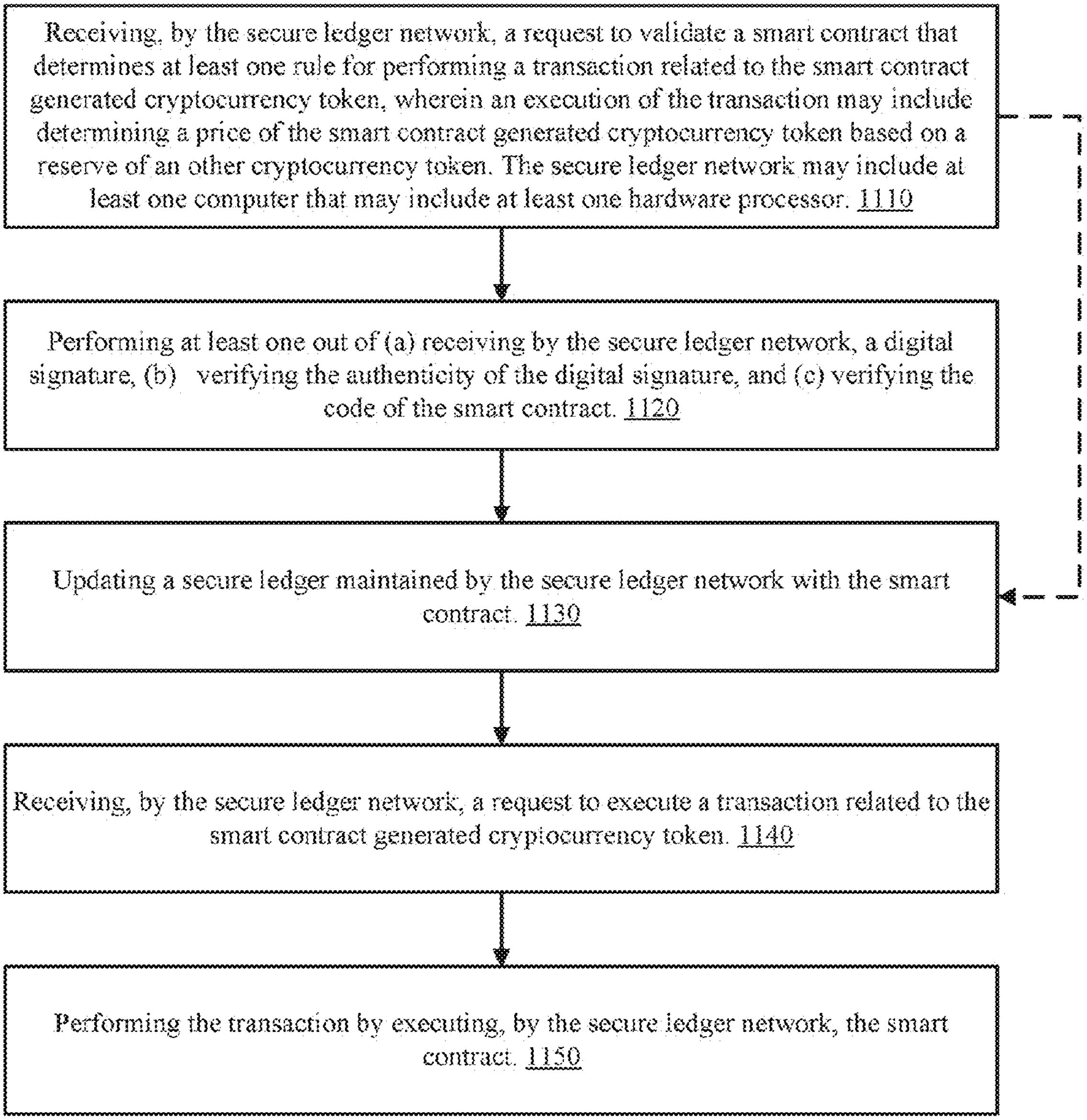
FIG. 11 is an example of a method.

FIG. 11 illustrates method 1100.

Method 1100 is for executing a transaction using a smart contract generated cryptocurrency token by a secure ledger network.

Method 1100 may include steps 1110, 1120, 1130, 1140 and 1150.

Step 1110 may include receiving, by the secure ledger network, a request to validate a smart contract that determines at least one rule for performing a transaction related to the smart contract generated cryptocurrency token, wherein an execution of the transaction may include determining a price of the smart contract generated cryptocurrency token based on a reserve of an other cryptocurrency token. The secure ledger network may include at least one computer that may include at least one hardware processor. Step 1110 may be followed by step 1120 or may be followed by step 1130.

Step 1120 may include at least one of the following: (a) receiving by the secure ledger network, a digital signature, (b) verifying the authenticity of the digital signature, and (c) verifying the code of the smart contract.

Step 1130 of updating a secure ledger maintained by the secure ledger network with the smart contract.

Step 1140 of receiving, by the secure ledger network, a request to execute a transaction related to the smart contract generated cryptocurrency token.

Step 1150 of performing the transaction by executing, by the secure ledger network, the smart contract.

The generation of the smart contract generated cryptocurrency token and using such token saves a lot of computational resources as the generating and usage of such token involves much less resources than required for generating a standard token and/or using dedicated exchange infrastructures that are required to convert predefined tokens for other predefined tokens.

Figure 12:
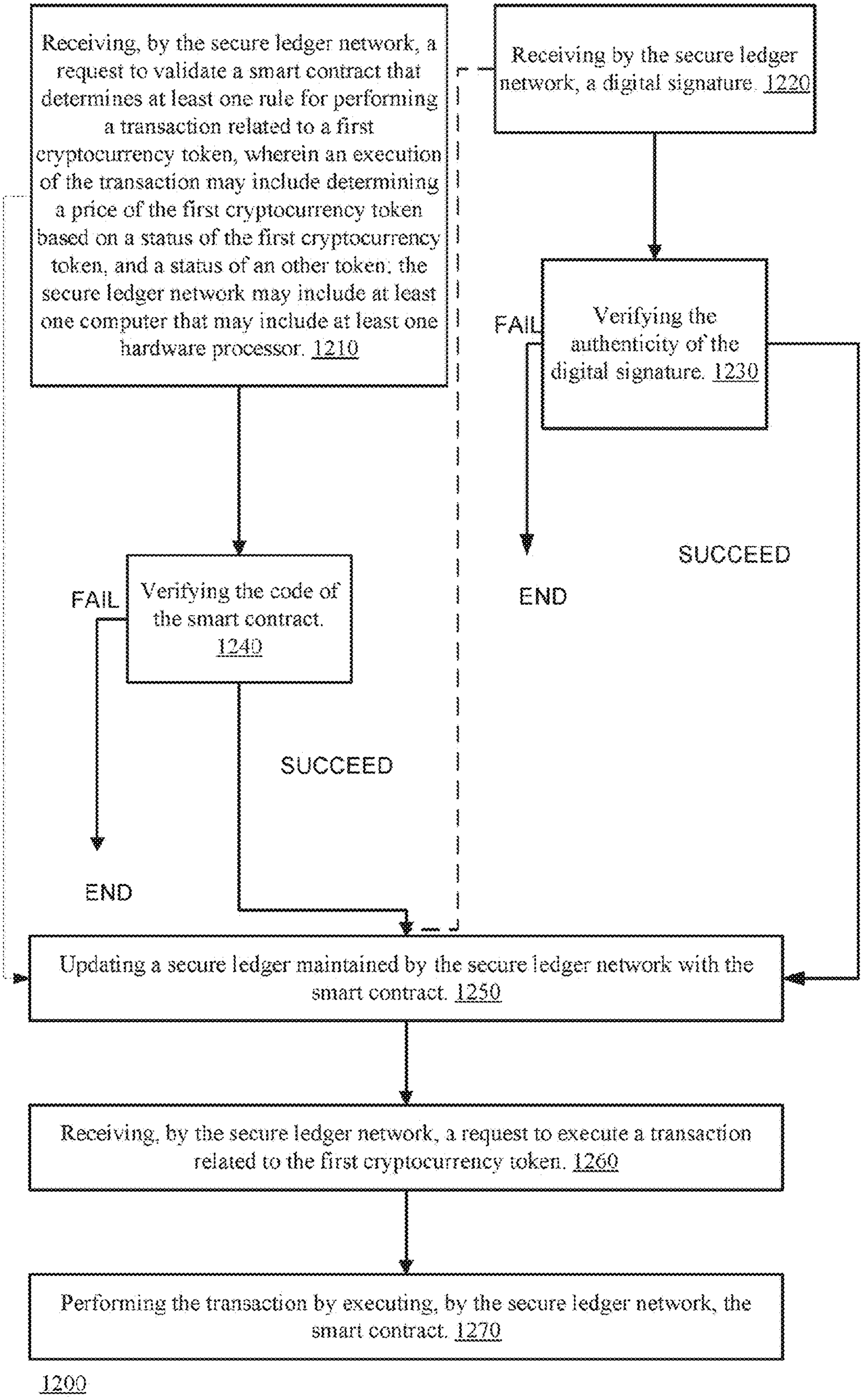
FIG. 12 is an example of a method.

FIG. 12 illustrates method 1200.

Method 1200 is for executing transactions by a secure ledger network.

Method 1200 may include steps 1210, 1220, 1230, 1240 and 1250.

Steps 1210 and 1220 may be followed by steps 1230 and 1240.

Steps 1230 and 1240 (if both are successful) may be followed by step 1250.

Step 1250 may be followed by steps 1260 and 1270.

Step 1210 may include receiving, by the secure ledger network, a request to validate a smart contract that determines at least one rule for performing a transaction related to a first cryptocurrency token, wherein an execution of the transaction may include determining a price of the first cryptocurrency token based on a status of the first cryptocurrency token, and a status of an other token; the secure ledger network may include at least one computer that may include at least one hardware processor.

Step 1220 may include receiving by the secure ledger network, a digital signature.

Step 1230 may include verifying the authenticity of the digital signature.

Step 1240 may include verifying the code of the smart contract.

Step 1250 may include updating a secure ledger maintained by the secure ledger network with the smart contract.

Step 1260 may include receiving, by the secure ledger network, a request to execute a transaction related to the first cryptocurrency token.

Step 1270 may include performing the transaction by executing, by the secure ledger network, the smart contract.

Figure 13:
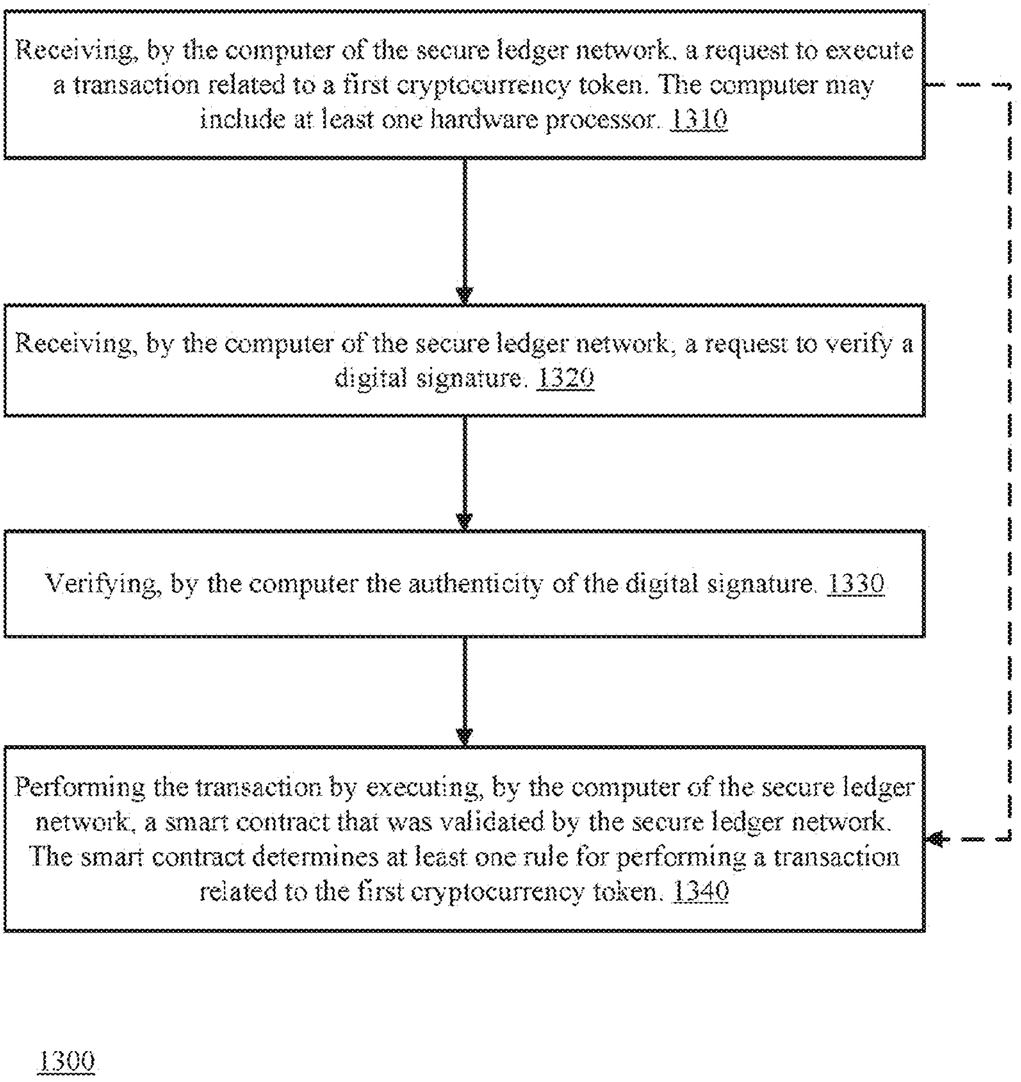
FIG. 13 is an example of a method.

FIG. 13 illustrates method 1300.

Method 1300 is for executing transactions by a computer of a secure ledger network.

Step 1310 of receiving, by the computer of the secure ledger network, a request to execute a transaction related to a first cryptocurrency token. The computer may include at least one hardware processor.

Step 1310 may be followed by step 1320 or by step 1340.

Step 1320 may include receiving, by the computer of the secure ledger network, a request to verify a digital signature.

Step 1330 may include verifying, by the computer the authenticity of the digital signature.

Step 1340 of performing the transaction by executing, by the computer of the secure ledger network, a smart contract that was validated by the secure ledger network. The smart contract determines at least one rule for performing a transaction related to the first cryptocurrency token.

Step 1340 may include determining a price of the first cryptocurrency token based on a status of the first cryptocurrency token, and a status of an other token.

Step 1340 may also include updating the secure ledger about a completion of the transaction.

Figure 14:
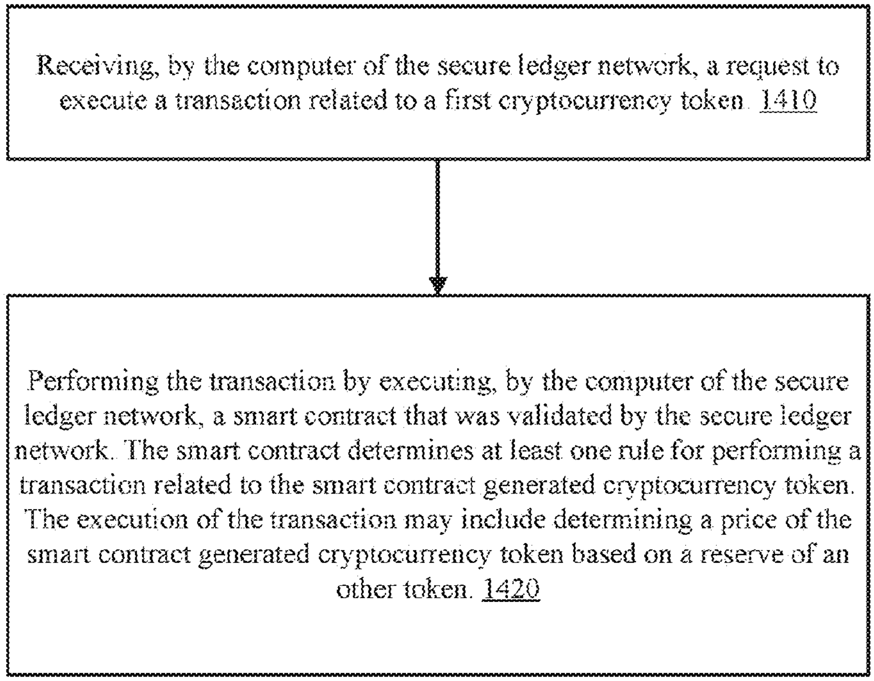
FIG. 14 is an example of a method.

FIG. 14 illustrates method 1400.

Method 1400 is for executing transactions involving a smart contract generated cryptocurrency token by a computer of a secure ledger network.

Method 1400 may start by step 1410 that is followed by step 1420.

Step 1410 may include receiving, by the computer of the secure ledger network, a request to execute a transaction related to a first cryptocurrency token.

Step 1420 may include and performing the transaction by executing, by the computer of the secure ledger network, a smart contract that was validated by the secure ledger network. The smart contract determines at least one rule for performing a transaction related to the smart contract generated cryptocurrency token. The execution of the transaction may include determining a price of the smart contract generated cryptocurrency token based on a reserve of an other token.

Step 1420 may include updating the secure ledger about a completion of the transaction.

Although one or more of the previously examples may relate to an underlying token and a single token, it is noted that the exchanges can take place between more than two types of tokens and/or use multiple reserves of multiple types of tokens.

For example—bancor tokens can hold more than one reserve (while using the exact same reserve mechanism described in the patent for each one) and by that become a basket of tokens, which also facilitate conversion between the two tokens. Since every asset can be easily tokenized on Ethereum, Bancor can provide a superior model for asset exchange of any kind.

The foregoing description and illustrations of the embodiments of the invention has been presented for the purposes of illustration. It is not intended to be exhaustive or to limit the invention to the above description in any form.

Any term that has been defined above and used in the claims, should be interpreted per this definition.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. In some embodiments, the block chain system disclosed, SS the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as ‘computer systems’.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word ‘comprising’ does not exclude the presence of other elements or steps then those listed in a claim. Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles. Unless stated otherwise, terms such as “first” and “second” are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A secure ledger network system for executing smart contract generated cryptocurrency transactions, the secure ledger network system comprising:

at least one hardware processor, and a non-transitory machine-readable storage medium having an executable computer readable program code, the at least one hardware processor being configured to execute the computer-readable program code to:

receive a request to validate a smart contract;

determine whether to validate the smart contract, wherein determining of whether to validate the smart contract comprising:

receiving a digital signature; and validate the smart contract by verifying authenticity of the digital signature, wherein the digital signature contains information regarding a source of the transaction for validation; and determining authenticity of the source of the transaction;

in response to a determination to validate the smart contract, update a secure ledger maintained with the smart contract;

receive a request to execute, a transaction using the smart contract;

in response to a determination to validate the request, perform the transaction by executing the smart contract by the secure ledger network; and update a secure ledger maintained about a completion of the transaction;

wherein the transaction comprises an exchange of a reserve cryptocurrency token and a smart contract generated cryptocurrency token, which can be minted or destroyed by the smart contract;

wherein the smart contract is configured to:

hold in a reserve a reserve cryptocurrency token used for performing the transaction related to the smart contract generated cryptocurrency token; and manage the exchange by transferring tokens to or from a user based on a relationship among parameters comprising a total reserve of the reserve cryptocurrency token, and a total amount of the smart contract generated cryptocurrency token in circulation.

2. The system of claim 1, wherein the transaction further comprises a deposited amount of the reserve cryptocurrency token to be added to the reserve and the smart contract is further configured to manage the exchange by minting additional smart contract generated cryptocurrency tokens in an amount determined using the relationship among parameters further comprising the deposited amount of the reserve cryptocurrency token, and a ratio of the total reserve and a token market cap of the smart contract generated cryptocurrency token.

3. The system of claim 2, wherein the amount of smart contract generated cryptocurrency tokens is transferred from an operator to the user.

4. The system of claim 1, wherein the transaction further comprises receiving an amount of smart contract generated cryptocurrency tokens as part of the exchange and the smart contract is further configured to manage the exchange by destroying received smart contract generated cryptocurrency tokens and remove an amount of reserve cryptocurrency token from the reserve determined using the pre-determined relationship among parameters further comprising: the received amount of smart contract generated cryptocurrency tokens, and a ratio of the total reserve and a token market cap of the smart contract generated cryptocurrency token.

5. The system of claim 4, wherein the received amount of smart contract generated cryptocurrency tokens is transferred from the user to an operator.

6. The system of claim 1, wherein the relationship between the total reserve and the total amount of the smart contract generated cryptocurrency comprises a constant.

7. The system of claim 1, wherein the relationship is determined according to at least one user defined input parameter.

8. The system of claim 1, wherein the relationship comprises a ratio of the total reserve and the total amount.

9. The system of claim 1, wherein the determination to validate the smart contract comprises verifying a code of the smart contract.

10. The system of claim 1, wherein the determination to validate the smart contract comprises determining that a party is willing to pay for upload of the smart contract to the secure ledger.

11. The system of claim 1, wherein the determination to validate the smart contract comprises determining authenticity of a source of the request to validate the smart contract.

12. The system of claim 1, wherein the determination to validate the request to execute the transaction comprises receiving a digital signature and verifying authenticity of the digital signature.

13. The system of claim 1, wherein the secure ledger network is a blockchain network.

14. The system of claim 1, wherein the reserve cryptocurrency token is a standard token.

15. A non-transitory machine-readable storage medium for executing smart contract generated cryptocurrency transactions having an executable computer readable program code for causing at least one hardware processor of a secure ledger network system that when the at least one hardware processor executing the computer readable program code to:

receive a request to validate, a smart contract;

determine whether to validate the smart contract, wherein determining of whether to validate the smart contract comprising:

receive a digital signature; and validate the smart contract by verifying authenticity of the digital signature, wherein the digital signature contains information regarding a source of the transaction for validation; and determining authenticity of the source of the transaction;

in response to a determination to validate the smart contract, update a secure ledger maintained with the smart contract;

receive a request to execute a transaction by using the smart contract;

in response to validating the request, perform the transaction by executing the smart contract; and update a secure ledger maintained about a completion of the transaction;

wherein the transaction comprises an exchange of a reserve cryptocurrency token and a smart contract generated cryptocurrency token, which can be minted or burned by the smart contract; and wherein the smart contract is configured to:

hold in a reserve a reserve cryptocurrency token used for performing a transaction related to a smart contract generated cryptocurrency token; and manage the exchange by transferring tokens to or from a user based on a relationship among parameters comprising: a total reserve of the reserve cryptocurrency token in the reserve, and a total amount of the smart contract generated cryptocurrency token in circulation.

16. The non-transitory machine-readable storage medium of claim 15, wherein the transaction further comprises a deposited amount of the reserve cryptocurrency token to be added to the reserve and the smart contract is further configured to manage the exchange by minting additional smart contract generated cryptocurrency tokens in an amount determined using the relationship among parameters further comprising the deposited amount of the reserve cryptocurrency token, and a ratio of the total reserve and a token market cap of the smart contract generated cryptocurrency token.

17. The non-transitory machine-readable storage medium of claim 16, wherein the amount of smart contract generated cryptocurrency tokens is transferred from an operator to the user.

18. The non-transitory machine-readable storage medium of claim 15, wherein the transaction further comprises receiving an amount of smart contract generated cryptocurrency tokens as part of the exchange and the smart contract is further configured to manage the exchange by destroying received smart contract generated cryptocurrency tokens and remove an amount of reserve cryptocurrency token from the reserve determined using the relationship among parameters further comprising: the received amount of smart contract generated cryptocurrency tokens, and a ratio of the total reserve and a token market cap of the smart contract generated cryptocurrency token.

19. The non-transitory machine-readable storage medium of claim 18, wherein the received amount of smart contract generated cryptocurrency tokens is transferred from the user to an operator.

20. The non-transitory machine-readable storage medium of claim 15, wherein the relationship between the total reserve and the total amount of the smart contract generated cryptocurrency comprises a constant.

21. A non-transitory machine-readable storage medium for executing cryptocurrency transactions having an executable computer readable program code for causing at least one hardware processor of a secure ledger network system that when the at least one hardware processor executing the computer-readable program code to:

receive a request to validate a smart contract;

determine whether to validate the smart contract, wherein determining of whether to validate the smart contract comprising:

receiving a digital signature; and validate the smart contract by verifying authenticity of the digital signature, wherein the digital signature contains information regarding a source of the transaction for validation; and determining authenticity of the source of the transaction;

in response to a determination to validate the smart contract, update a secure ledger maintained with the smart contract;

receive a request to execute a transaction by using the smart contract;

in response to validating the request, perform the transaction by executing the smart contract; and update a secure ledger maintained about a completion of the transaction;

wherein the transaction comprises an exchange of a first reserve cryptocurrency token and a second reserve cryptocurrency token; and wherein the smart contract is configured to:

hold in a first reserve a first reserve cryptocurrency token;

hold in a second reserve a second reserve cryptocurrency token; and manage the exchange by transferring tokens based on a relationship among parameters comprising:

a first reserve amount of the first reserve cryptocurrency token held in the first reserve, a second reserve amount of the second reserve cryptocurrency token held in the second reserve, and a reserve ratio between the first and second reserve cryptocurrency tokens.

* * * * *